United States Patent [19]

Hoffner, II

[11] Patent Number: 4,628,446
[45] Date of Patent: Dec. 9, 1986

[54] MULTICHANNEL INTERFACE

[75] Inventor: Charles W. Hoffner, II, Naperville, Ill.

[73] Assignee: AT&T Bell Laboratories, Murray Hill, N.J.

[21] Appl. No.: 447,272

[22] Filed: Dec. 6, 1982

[51] Int. Cl.[4] .............................................. G06F 13/38
[52] U.S. Cl. ..................................... 364/200; 364/900
[58] Field of Search ... 364/200 MS File, 900 MS File

[56] References Cited

U.S. PATENT DOCUMENTS

| | | | |
|---|---|---|---|
| 3,821,480 | 6/1974 | Dundon et al. | 179/15 |
| 3,872,444 | 3/1975 | Cleveland et al. | 340/172.5 |
| 4,016,367 | 4/1977 | Law et al. | 179/15 |
| 4,024,505 | 5/1977 | Sperling | 340/172.5 |
| 4,052,702 | 10/1977 | Smith et al. | 364/200 |
| 4,095,266 | 6/1978 | Carubia et al. | 364/200 |
| 4,097,695 | 6/1978 | Grace et al. | 179/15 |
| 4,183,084 | 1/1980 | Lawson | 364/200 |
| 4,188,665 | 2/1980 | Nagel et al. | 364/200 |
| 4,218,742 | 8/1980 | Carlton | 364/200 |
| 4,264,984 | 4/1981 | Anderson | 364/900 |
| 4,271,518 | 6/1981 | Birzele et al. | 364/200 |
| 4,276,594 | 6/1981 | Morley | 364/200 |
| 4,293,924 | 10/1981 | Struger et al. | 364/900 |

OTHER PUBLICATIONS

J. Tallman, "The Model I as a Dumb Terminal", 80 *Microcomputing*, pp. 276-294 (Apr. 1981).

T. Loos, "300 Baud Terminal", 80 *Microcomputing*, pp. 136-140, (Aug. 1980).

T. Dollhoff, 16 *Bit Microprocessor Architecture*, pp. 290-298, 438-439.

*Primary Examiner*—James R. Hoffman
*Attorney, Agent, or Firm*—David Volejnicek

[57] ABSTRACT

Disclosed is a method and apparatus for interfacing N bit-serial communication channels to an N-bit parallel communication channel. The serial channels are interfaced simultaneously, i.e., during a single bit time, with the parallel channel by an interface unit that is shared by the serial channels. The interface unit is microprocessor based. To service all serial channels simultaneously, the microprocessor's interface program divides each bit interval into 2N time slots and allocates two time slots per bit interval to each of the N channels, one time slot for functions associated with receipt of bits from the serial channel and transmittal thereof on the parallel channel, and one time slot for functions associated with receipt of data from the parallel channel and transmittal thereof on the serial channel. At the beginning of each time slot the program causes an updated word to be transmitted to the serial channels, one bit to each channel, and a sample word to be received from the serial channels, one bit sample from each channel. The program identifies the samples of centers of the bits received from the serial channels and uses these as the received bit values.

33 Claims, 19 Drawing Figures

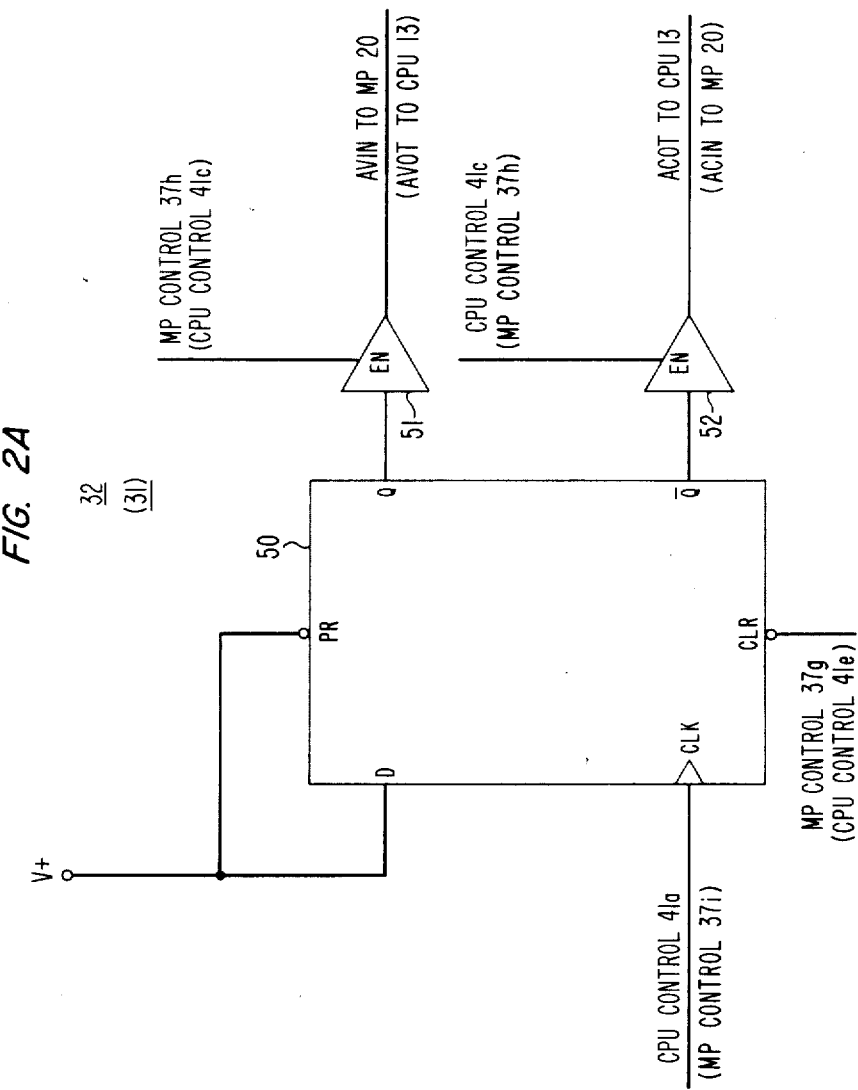

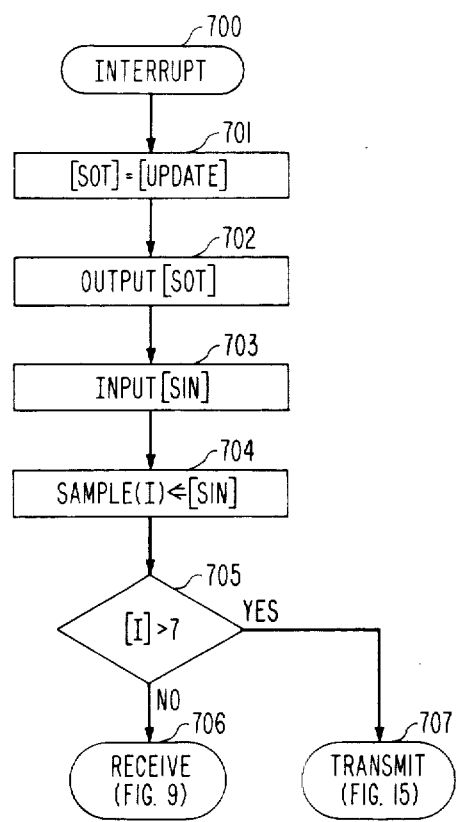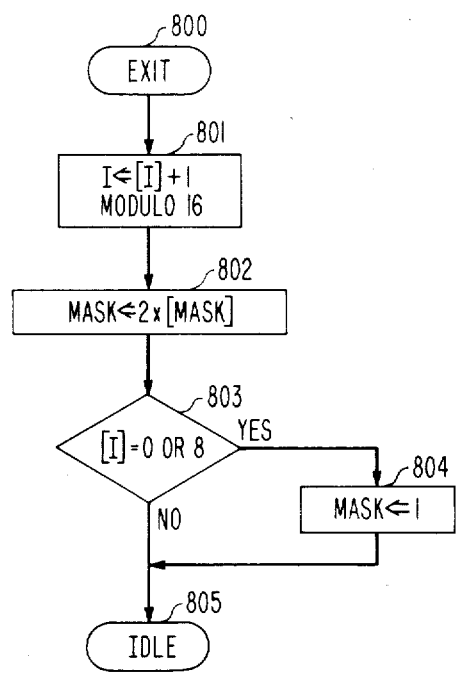

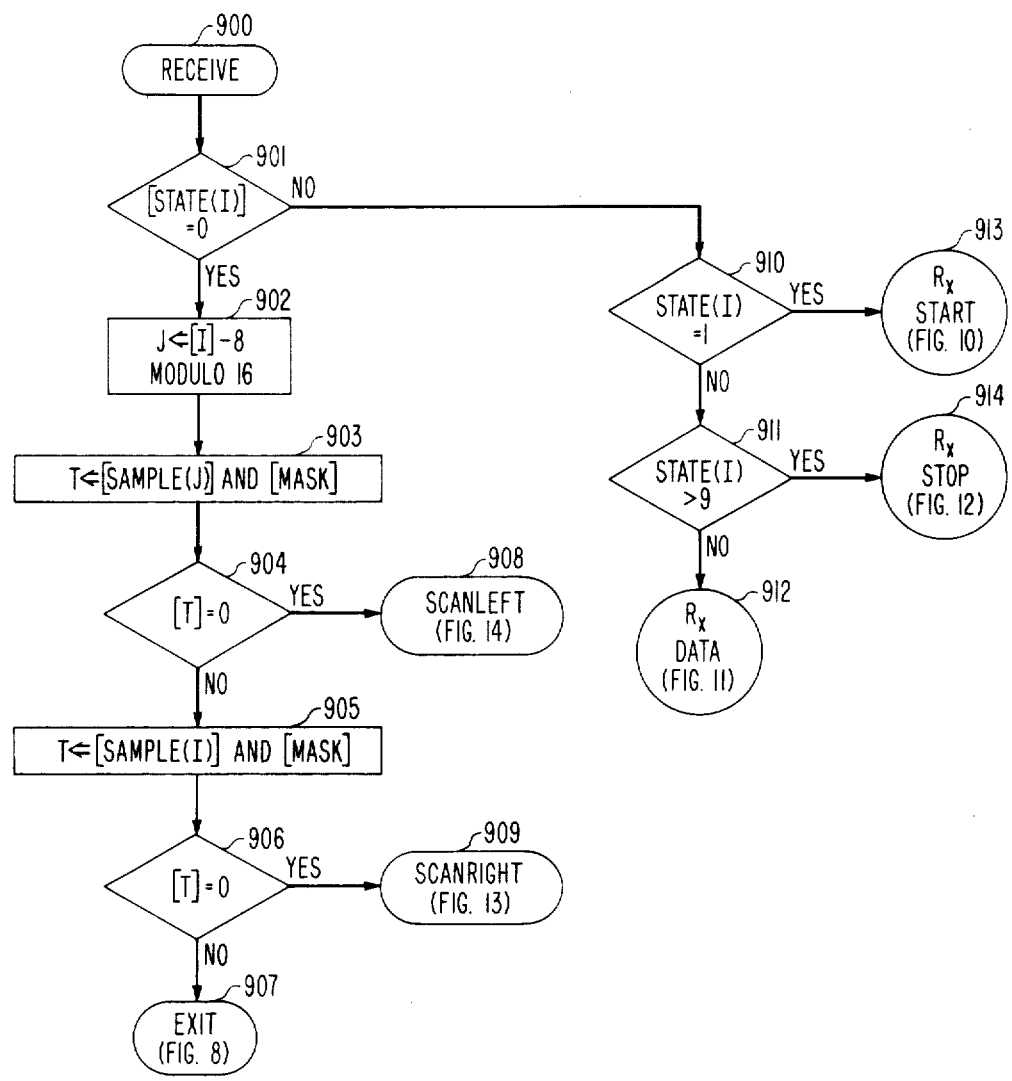

MULTICHANNEL INTERFACE

TECHNICAL FIELD

The invention relates generally to computer systems, and more particularly to arrangements for interfacing of a plurality of input and output channels to central processing means in such systems.

BACKGROUND OF THE INVENTION

A time-shared computer system allows each user of the system to interact with the system resources substantially independently of the interactions of other users. Because the cost of system resources is shared among a plurality of users in such a system, each user may be provided with a larger set of resources than would economically be possible to provide to him on a dedicated basis.

A time-shared computer system commonly comprises a plurality of terminals, each dedicated to a user of the system, which are in communication with a central processor that controls the system shared resources and performs computations. Each terminal commonly communicates with the central processor over a separate communication channel, and the plurality of channels are selectively connected to the central processor's single input and output port by a multiplexer. The processor is typically a parallel communicating device whereas the terminals are typically serial communicating devices. Interconnection between the terminals and the processor is provided by input and output interface devices which perform the necessary serial-to-parallel and parallel-to-serial conversions and buffering of communications.

With the continuing improvements in the speed and computing capacity of microelectronics and microcomputers, the potential of computer systems for time-shared use has expanded. However, in prior art systems the interface devices have created a bottleneck between the processor and the terminals, from the standpoint of both economics and performance. Applications of time-shared systems to industrial, business, and educational tasks have not been expanded to their full potential in part because the density of input and output transfers between the processor and the terminals has not been significantly increased without adding to the cost of interface circuitry.

Conventionally, the key element of the interface device has been a Universal Asynchronous Receiver and Transmitter (UART). A separate UART has been provided at the central processor for each channel to enable all terminals to receive and transmit communications simultaneously. Dedication of a UART to each channel at the central processor contravenes the concept of time-sharing, as there is no sharing of the UART capabilities by the system users and hence each channel must bear the full cost of a UART whether or not it is fully utilizing its capabilities. The cost of providing a multiplicity of UARTS can be significant, especially in systems having many terminals.

To alleviate this economic disadvantage, the prior art has allowed some sharing of interface circuitry between the channels at the central processor. However, current modules of this type still require substantial circuitry dedicated to each channel in addition to the shared circuitry. And the dedicated circuitry is often more complex and more closely than a UART which performs all required channel functions with no sharing of circuitry. Furthermore, the shared interfaces of the prior art have not interfaced the communications of all associated channels simultaneously. Rather they have serviced the channels sequentially, one at a time, while forcing the channels not currently being serviced to wait for service. The performance capability of the shared interfaces has been lacking as a result.

SUMMARY OF THE INVENTION

This invention is directed toward solving these and other disadvantages of the prior art input and output interface devices.

According to this invention, a plurality of narrow communication channels are interfaced to a wide communication channel by apparatus that is shared by the narrow channels and that handles communications simultaneously with the plurality of narrow channels. Apparatus shared by the narrow channels selectively receives on the wide channel a wide word associated with a narrow channel and comprising a plurality of narrow words. Narrow words are transmitted simultaneously on the plurality of narrow channels by the interface, and the interface receives narrow words simultaneously from the plurality of narrow channels. Apparatus shared by the narrow channels selectively transmits on the wide channel a wide word comprising narrow words received on a narrow channel.

In one embodiment, the narrow channels are serial channels that transport a bit at a time and the wide channel is a bit parallel channel that transports a multibit word at a time. Reception and transmission on the serial channels is periodically repeated. Preferably, a bit on a serial channel has a predetermined interval of duration, and reception and transmission on the serial channels is repeated at least once every bit interval.

Advantageously, bits being received from the plurality of serial channels are sampled, and samples of central portions of received bits are selectively identified. Words transmitted on the bit parallel channel then comprise samples of the central portions of bits received on a serial channel.

Advantageously, an interface module constructed according to this invention provides greater channel density and lower cost per interface module than existing modules that share circuitry among a group of channels. The inventive interface also improves density of input and output transfers. The present invention eliminates the need for extensive and costly circuitry dedicated to each channel, and minimizes the circuitry provided on a per channel basis. Yet the invention allows all channels to be serviced simultaneously, for both transmit and receive functions. Received signal sampling and transmission updating is evenly spaced in time and occurs at a multiple of the Baud rate, or rate of transmission of bits, to ensure accurate tolerance on bit timing for the serial transmission and reception. The inventive scheme provides an efficient mechanism for achieving and maintaining synchronization with a plurality of channels that operate asynchronously. The inventive apparatus is efficient in assembling bits into characters and in disassembling characters into bits, and in handing channel numbers and communication start/-stop indicating bits. The invention provides safeguards against false communication start indicating bits being received from the channel.

The illustrative inventive apparatus is based on a microcomputer and requires a minimum of additional components. It maintains its own channel status and data buffers, in a common memory. The apparatus is programmable and easily reprogrammed to incorporate additional features. The operation and functional characteristics of the inventive apparatus are transparent to the software of the devices being interfaced on both sides of the apparatus. Thus the inventive interface is suited for retrofit into existing systems.

These and other advantages and features of the present invention will become apparent from the following description of an illustrative embodiment of the invention, taken together with the drawing.

BRIEF DESCRIPTION OF THE DRAWING

FIG. 2a is a schematic diagram of flags of the interface unit of FIG. 1;

FIGS. 6-18 are flowcharts of the interface program of the microprocessor of FIG. 2, wherein
FIG. 6 is a flowchart of an initialization routine,
FIG. 7 is a flowchart of an interrupt handling routine,
FIG. 8 is a flowchart of an exit routine,
FIG. 9 is a flowchart of a receive routine,
FIG. 10 is a flowchart of a receive start routine,
FIG. 11 is a flowchart of a receive data routine,
FIG. 12 is a flowchart of a receive stop routine,
FIG. 13 is a flowchart of a scanright routine,
FIG. 14 is a flowchart of a scanleft routine,
FIG. 15 is a flowchart of a transmit routine,
FIG. 16 is a flowchart of a transmit start routine,
FIG. 17 is a flowchart of a transmit data routine,
and
FIG. 18 is a flowchart of a transmit stop routine.

DETAILED DESCRIPTION

Figure 1:
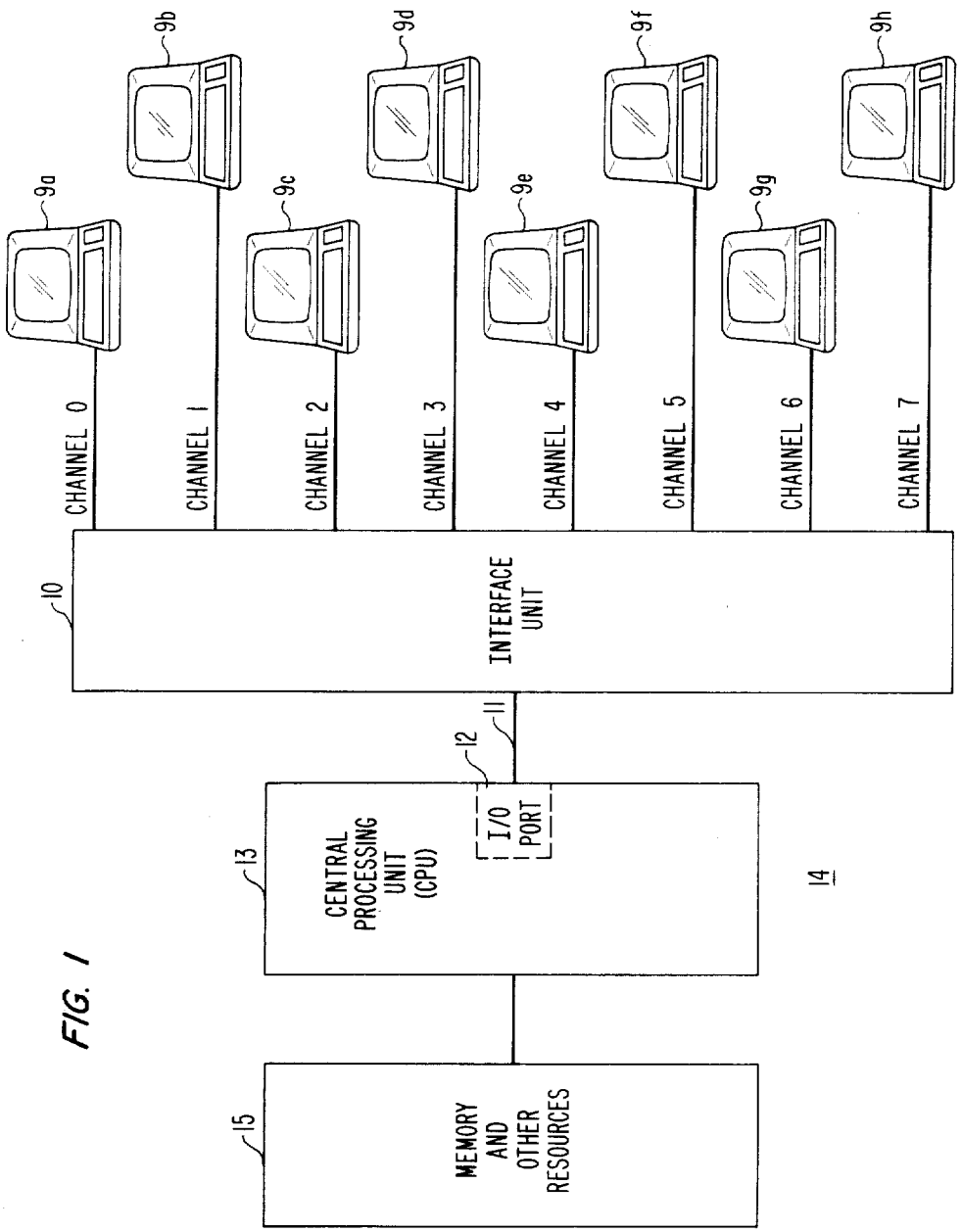
FIG. 1 is a block diagram of a time-shared computer systems.

Referring now to the drawing, FIG. 1 shows the basic configuration of an illustrative time-shared computer system 14. The system 14 includes a central processing unit (CPU) 13 which performs the system computational tasks and controls the operation of the system's memory and other resources 15 which are connected for communication with the CPU 13.

From the viewpoint of a system user, both the CPU 13 and the memory and other resources 15 are resources utilized by system users on a time-shared basis. Each user of the system 14 has a dedicated terminal 9 for interacting with the CPU 13 and therethrough with the memory and other resources 15.

The terminals 9 are interfaced to the CPU 13 by a common interface unit 10. The interface unit 10 interfaces communications between each terminal 9 and the CPU 13. The interface unit 10 is connected to an input and output port 12 of the CPU 13 by a CPU communication bus 11 for purposes of receiving data from and transferring data to the CPU 13. For purposes of data reception from and transmission to the terminals 9, the interface unit 10 is connected to each terminal 9 via one of eight communication channels 0 through 7. In this illustrative example the interface unit 10 is capable of interfacing up to eight serial channels to the I/O port 12 of the CPU 13. Therefore eight channels 0-7 are shown in FIG. 1, each connecting to a single terminal 9a-9h, respectively. Of course, the illustrative interface unit 10 may be used to interface fewer than eight channels to the CPU 13. While the illustrative embodiment of the interface unit 10 is described as interfacing eight channels 0-7, a different embodiment may interface any convenient number of channels to the CPU 13.

Figure 2:
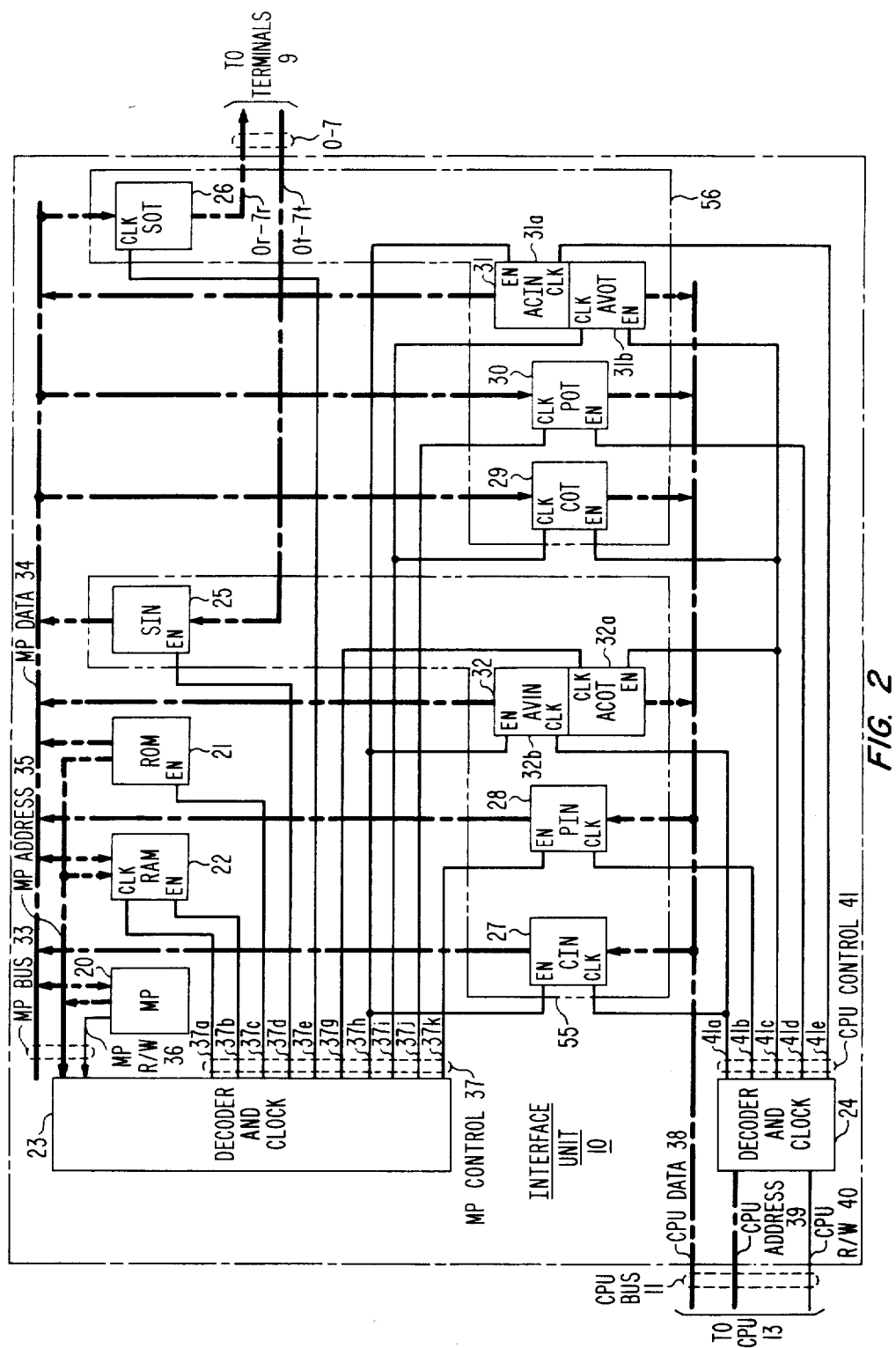
FIG. 2 is a block diagram of the interface unit of FIG. 1.

The interface unit 10 is shown in greater detail in FIG. 2. The interface unit 10 is configured around a microprocessor (MP) 20. Any suitable general purpose microprocessor may be utilized. For purposes of this example, an 8-bit microprocessor 20 is shown in FIG. 2. The microprocessor 20 operates under control of an interface program which is stored in a read-only memory (ROM) 21. The microprocessor 20 handles communications passing from the terminals 9 to the CPU 13 via a set 55 of buffers and flags; the microprocessor 20 uses a set 56 of buffers and flags to handle communications passing from the CPU 13 to the terminals 9. In either case a RAM 22 serves the microprocessor 20 as working storage.

Through a buffer gate SIN 25 the microprocessor 20 periodically samples bit signals being transmitted on the channels 0-7. The microprocessor 20 assembles the received bits into words and transmits the words and the identity of the originating channel 0-7 to the CPU 13 through buffer registers POT 30 and COT 29, respectively, utilizings flag ACIN 31a and AVOT 31b for communication handshaking with the CPU 13. The microprocessor 20 receives from the CPU 13 a word of information and the identity of the destination channel 0-7 through buffer registers PIN 28 and CIN 27, respectively, utilizing flags ACOT 32a and AVIN 32b for communication handshaking with the CPU 13. The microprocessor 20 disassembles the received words into bits. Through a buffer register SOT 26 the microprocessor 20 then transmits the bits on their designated channels 0-7.

The microprocessor 20 communicates with the various devices that are included in the interface unit 10 across a microprocessor (MP) bus 33. The MP bus 33 comprises an 8-bit wide MP DATA bus 34, an MP ADDRESS bus 35, and an MP read and write (R/W) line 36. The MP ADDRESS bus 35 and the MP R/W line 36 are connected to inputs of a decoder and clock 23. The decoder and clock 23 is a conventional device which monitors its inputs and in response to signals appearing thereon selectively strobes, or pulses, its outputs. The outputs of the decoder and clock 23 connect to microprocessor (MP) CONTROL lines 37a-k which lead to the various devices of the interface unit 10, where they connect to selected enable (EN) and clock (CLK) control inputs of the various devices. The MP DATA bus 34 connects directly to inputs and outputs of the various devices.

The CPU 13 communicates with devices of the interface unit 10 in a similar manner. The CPU bus 11 is comprised of a CPU DATA bus 38, a CPU ADDRESS bus 39, and a CPU R/W line 40. The CPU ADDRESS bus 39 and the CPU R/W line 40 connect to inputs of a decoder and clock 24. The decoder and clock 24 is functionally similar to the decoder and clock 23: it monitors its inputs and selectively strobes or pulses its outputs in response thereto. The outputs of the decoder and clock 24 connect to CPU CONTROL lines 41a-e which lead to selected devices of the interface unit 10 and there connect to selected EN and CLK control inputs of those devices. The CPU DATA bus 38 connects directly to data inputs and outputs of the selected devices.

The CPU 13 communicates with the microprocessor 20 through the series of buffers 27-30 and flags 31-32. The buffers 27-30 interface the MP DATA bus 34 with the CPU DATA bus 38, while the flags 31-32 indicate to both the microprocessor 20 and to the CPU 13 the status of their commmunications.

The microprocessor 20 and the CPU 13 are parallel communicating devices capable of simultaneously transmitting or receiving a plurality of bits that make up a word, or byte, of information. In this illustrative example, a byte is assumed to be 8 bits wide. Thus the microprocessor 20 and the CPU 13 can send data to each other a byte at a time.

To forward to the microprocessor 20 a byte of data, the CPU 13 utilizes the buffer PIN (parallel input) 28. PIN 28 is a conventional 8 bits wide latch with three-state mode gates at its outputs.

A three-state mode gate is such that its outputs are adapted to selectively assume any one of three conditions, or signal levels. For purposes of this example, the three levels are considered to be the following: a first level in which the output is asserted low, a second level in which the output is asserted high, and a third level which is neutral, referred to as the Tristate ® level, in which the output is not asserted and floats.

Data inputs of PIN 28 are connected to the CPU DATA bus 38 and data outputs of PIN 28 are connected to the MP DATA bus 34. MP CONTROL line 37k connects to EN control input of PIN 28, while CPU CONTROL line 41b connects to CLK control input of PIN 28.

To send the byte of data to the microprocessor 20, the CPU 13 outputs the byte on the CPU DATA bus 38 and causes the decoder and clock 24 to assert the CPU CONTROL line 41b. This causes PIN 28 to accept the data from the CPU DATA bus 38 and to latch it.

When the microprocessor 20 wishes to read the data from PIN 28, it causes the decoder and clock 23 to assert MP CONTROL line 37k. This causes the outputs of PIN 28 to leave the Tristate level and to gate the latched data onto the MP DATA bus 34, which then conducts the data to the microprocessor 20.

Each byte of information passing between the CPU 13 and the microprocessor 20 is associated with a particular one of the channels 0-7. To inform the microprocessor 20 of the identity (ID) of a channel 0-7 for which the data is intended, the CPU 13 utilizes the buffer CIN (channel input number) 27. CIN 27, like PIN 28, is a conventional latch with three-state mode gates at its outputs, but CIN 27 is only 3 bits wide.

Data inputs of CIN 27 are connected to three lines of the CPU DATA bus 38 and data outputs of CIN 27 are connected to corresponding three lines of the MP DATA bus 34. MP CONTROL line 37h connects to EN control input of CIN 27, while CPU CONTROL line 41a connects to CLK control input of CIN 27.

To send the ID of the designated channel 0-7 to the microprocessor 20, the CPU 13 outputs the channel's ID on the three lines of the CPU DATA bus 38 connected to CIN 27 and causes the decoder and clock 24 to assert the CPU CONTROL line 41a. This causes CIN 27 to accept the ID from the CPU DATA bus 38 and to latch it.

When the microprocessor 20 wishes to read the ID from CIN 27, it causes the decoder and clock 23 to assert MP CONTROL Line 37h. This causes the outputs of CIN 27 to leave the Tristate level and to gate the latched ID onto the MP DATA bus 34, which then conducts the ID to the microprocessor 20.

To inform the microprocessor 20 that a channel ID has been placed in CIN 27 and that a byte of data has been placed in PIN 28, as well as to determine whether the microprocessor 20 has retrieved data from PIN 28 and the ID from CIN 27, the CPU 13 uses the flags ACOT/AVIN (acknowledge output/available input) 32. ACOT/AVIN 32 is shown diagramed in FIG. 2a. As the structure shown there is also representative of the flags AVOT/ACIN 31, the connection of the structure of FIG. 2a to form the flags 31 is shown in parentheses.

As shown in FIG. 2a, the flags 32 are formed by a conventional flip-flop 50. In this example, the flip-flop 50 is a D-type flip-flop with preset and clear inputs. Inputs D and PR (preset) of the flip-flop 50 are connected to a voltage source V+ to tie the inputs of a logical "one" state. The CLK (clock) inpput of the flip-flop 50 is connected to CPU CONTROL line 41a and the CLR (clear) input of the flip-flop 50 is connected to the MP CONTROL line 37g. The outputs Q and $\overline{Q}$ of the flip-flop 50 are connected to inputs of three-state gates 51 and 52, respectively. The EN (enable) control inputs of the gates 51 and 52 are connected to the MP CONTROL Line 37h and to the CPU CONTROL line 41c, respectively. The output of the gate 51 connects to a line of the MP DATA bus 34 and the output of the gate 52 connects to a line of the CPU DATA bus 38, both of which lines are different from the three lines of each of those buses which connect to CIN 27.

The flip-flop 50 can logically be thought of as comprising a pair of interrelated flags ACOT 32a and AVIN 32b, wherein the output of the gate 51 represents the state of the flag AVIN 32b, and wherein the output of the gate 52 represents the state of the flag ACOT 32a. The logical flags 32a and 32b are interrelated in that they have opposite logical values and a change in the value of one is related to a change in the value of the other.

A strobe of the MP CONTROL line 37g asserts the flag ACOT 32a and deasserts the flag AVIN 32b. A strobe of the CPU CONTROL line 41a deasserts the flag ACOT 32a and asserts the flat AVIN 32b. A strobe of the MP CONTROL line 37h places the state of the flag AVIN 32b on the MP DATA bus 34, and a strobe of the CPU CONTROL line 41c places the state of the flat ACOT 32a on the CPU DATA bus 38.

To inform the microprocessor 20 that a word has been placed in PIN 28 and that a channel ID is being placed in CIN 27, after it places the channel ID on the CPU DATA bus 38 the CPU 13 causes the decoder and clock 24 to strobe the CPU CONTROL line 41a not only to load CIN 27, but also to assert the logical AVIN flag 32b and hence deassert the logical ACOT flag 32a.

To determine whether a word has been placed in PIN 28 and a channel ID has been placed in CIN 27, the microprocessor 20 causes the decoder and clock 23 to strobe the MP CONTROL line 37h, thus placing the value of the AVIN flag 32b, as well as the contents of CIN 27, on the MP DATA bus 34.

To advise the CPU 13 that it has retrieved the word from PIN 28 and the channel ID from CIN 27, the microprocessor 20 causes the decoder and clock 23 to strobe the MP CONTROL line 37g, thus asserting the logical ACOT flat 32a and hence deasserting the logical AVIN flag 32b.

To determine whether the word of data from PIN 28 and the channel ID from CIN 27 has been retrieved, the CPU 13 causes the decoder and clock 24 to strobe the CPU CONTROL line 41c, thus placing the value of the ACOT flag 32a on the CPU DATA bus 38.

Communications from the microprocessor 20 to the CPU 13 proceed in a manner directly analogous to that described above. Returning to a consideration of FIG. 2, for the purpose of forwarding a byte of data to the CPU 13, the microprocessor 20 utilizes the buffer POT (parallel output) 30. POT 30, like PIN 28, is an 8-bit wide latch with three-state mode gates at its outputs. Data inputs of POT 30 are connected to the MP DATA bus 34 and data outputs are connected to the CPU DATA bus 38. MP CONTROL line 37j connects to CLK control input of POT 30, while CPU CONTROL line 41d connects to EN control input of POT 30.

To send a byte of data to the CPU 13, the microprocessor 20 outputs the byte on the MP DATA bus 34 and causes the decoder and clock 23 to strobe the MP CONTROL line 37j. This causes POT 30 to accept the data from the bus 34 and to latch it.

When the CPU 13 wishes to read the data from POT 30, it causes the decoder and clock 24 to strobe the CPU CONTROL line 41d. This causes the outputs of POT 30 to leave the Tristate level and to gate the latched data onto the CPU DATA bus 38, which then conducts the data to the CPU 13.

To inform the CPU 13 of the identity of the channel for which the data in POT 30 is intended, the microprocessor 20 utilizes the buffer COT 29. Like CIN 27, COT 29 is a 3-bit wide latch with three-state mode gates at its outputs. Data inputs of COT 39 are connected to the same three lines of the MP DATA bus 34 as the outputs of CIN 27, and data outputs of COT 29 are connected to the corresponding three lines of the CPU DATA bus 38. MP CONTROL line 37i connects to CLK control input of COT 29, while CPU CONTROL line 41c connects to EN control input of COT 29.

To send the ID of the designated channel 0-7 to the CPU 13, the microprocessor 20 outputs the ID on the three lines of the MP DATA bus 34 which are connected to COT 29 and causes the decoder and clock 23 to strobe the MP CONTROL line 37i. This causes COT 29 to accept the ID from the MP DATA bus 34 and to latch it.

When the CPU 13 wishes to read the ID from COT 29, it causes the decoder and clock 24 to strobe CPU CONTROL line 41c. This causes the outputs of COT 29 to leave the Tristate level and to gate the latched ID onto the CPU DATA bus 38, which then conducts the ID to the CPU 13.

To inform the CPU 13 that a word of data has been placed in POT 30 and that a channel ID has been placed in COT 29, as well as to determine whether the CPU 13 has retrieved the data from POT 30 and the ID from COT 29, the CPU 13 uses the flags ACIN/AVOT 31 (acknowledge input/available output). As was mentioned above, ACIN/AVOT 31 are shown diagramed in FIG. 2a in conjunction with the flags 32, with designation unique to the flags 31 being enclosed in parentheses. The D-type flip-flop forming the flags 31 has D and PR inputs connected to a voltage source V+ to tie the inputs to a logical "one" state. The CLK input of the flip-flop 50 is connected to MP CONTROL line 37i and the CLR input of the flip-flop 50 is connected to the CPU CONTROL line 41e. The outputs Q and $\overline{Q}$ of the flip-flop 50 are connected to inputs of the three-state gates 51 and 52, respectively. The EN control inputs of the gates 51 and 52 are connected to the CPU CONTROL line 41c and to the MP CONTROL Line 37h, respectively. The output of the gate 51 connects to a line of the CPU DATA bus 38 different from those connected to the outputs of ACOT 32a and COT 29. The output of the gate 52 connects to a corresponding line of the MP DATA bus 34 which is different from those connected to the output of AVIN 32b and CIN 27.

The flip-flop 50 can be logically thought of as comprising a pair of interrelated flags AVOT 31b and ACIN 31a, wherein the output of the gate 51 represents the state of the flag AVOT 31b and wherein the output of the gate 52 represents the state of the flag ACIN 31a. The logical flags 31a and 31b have opposite logical values: a strobe of the MP CONTROL line 37i asserts the flag AVOT 31b and deasserts the flag ACIN 31a. A strobe of the CPU CONTROL line 41e deasserts the flag AVOT 31b and asserts the flag ACIN 31a. The strobe of the CPU CONTROL line 41c places the state of the flag AVOT 31b on the CPU DATA bus 38 and a strobe of the MP CONTROL line 37h places the state of the flag ACIN 31a on the MP DATA bus 34.

To inform the CPU 13 of the presence of data in POT 30 and of a channel ID in COT 29, after it places the channel ID on the MP DATA bus 34 the microprocessor 20 causes the decoder and clock 23 to strobe the MP CONTROL line 37i not only to load COT 29, but also to assert the flag AVOT 31b and hence deassert the flag ACIN 31a.

To determine whether a data word has been placed in POT 30 and a channel ID has been placed in COT 29, the CPU 13 causes the decoder and clock 24 to strobe the CPU CONTROL line 41c, thus placing the value of the AVOT flag 31b, as well as the contents of COT 30, on the CPU DATA bus 38.

To advise the microprocessor 20 that it has retrieved the data from POT 30 and the channel ID from COT 29, the CPU 13 causes the decoder and clock 24 to strobe the CPU CONTROL line 41e, asserting the logical ACIN flag 31a and hence deasserting the logical AVOT flag 31b.

To determine whether the word has been retrieved from POT 30 and the channel ID has been retrieved from COT 29, the microprocessor 20 causes the decoder a clock 23 to strobe the MP CONTROL line 37h, thus placing the value of the ACIN flag 31a on the MP DATA bus 34. As was explained above, strobing of the line 37h also places the contents of CIN 27 and the value of the AVIN flag 32b on the MP DATA bus 34.

Figure 3:
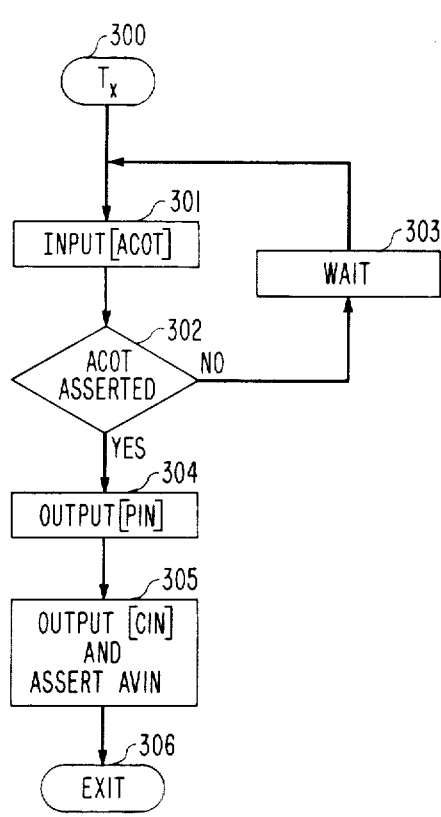
FIG. 3 is a flowchart of a transmission routine of the processor of FIG. 1.
Figure 4:
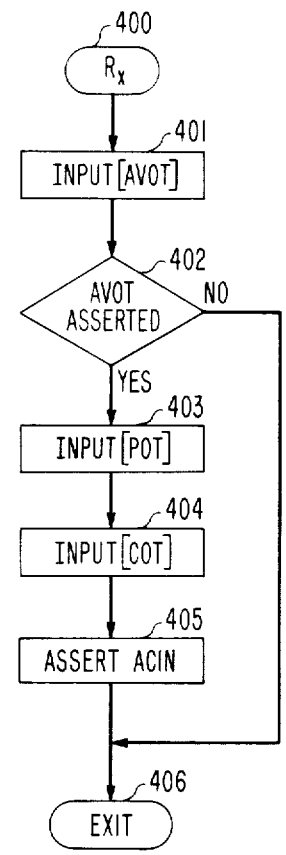
FIG. 4 is a flowchart of a reception routine of the processor of FIG. 1.

The protocol followed by the CPU 13 in communicating with the interface unit 10 is flowcharted in FIGS. 3 and 4.

FIG. 3 diagrams the routine followed by the CPU 13 in sending data to the interface unit 10. The CPU 13 enters the routine of FIG. 3 when it has a byte of data ready for transmission to a channel 0-7, as shown in block 300. The CPU 13 is caused to enter the routine of FIG. 3 in a conventional manner, for example by means of an interrupt. The CPU 13 first reads the logical ACOT flag 32a, as shown in block 301, to determine whether the microprocessor 20 has read out the contents of CIN 27 and PIN 28 and has thus freed CIN 27 and PIN 28 for loading with new information.

If ACOT 32a is deasserted, indicating that the microprocessor 20 has not yet read out both CIN 27 and PIN 28, the CPU 13 waits, as shown in block 303, for the microprocessor 20 to complete reading out both CIN 27 and PIN 28. During the wait the CPU 13 may be engaging in other activities. Following the wait the CPU 13 repeats the procedure outlined in the blocks 301 and 302, and again returns to the wait state of the block 303 if it still finds the ACOT flag 32a deasserted.

Upon finding ACOT 32a asserted in block 302, the CPU 13 outputs on the CPU DATA bus 38 the byte of data and loads it into PIN 28, as shown in block 304. The CPU 13 then outputs on the CPU DATA bus 38 the ID of the channel 0-7 for which the byte of data in PIN 28 is intended, loads the ID into CIN 27, and simultaneously asserts the logical AVIN flag 32b, as shown in block 305. As was described above, asserting of AVIN 32b results in deasserting of ACOT 32a and thus signals the microprocessor 20 that information is being sent to it.

At that point, the CPU 13 is done transferring the data to the interface module 10, and it exits the routine of FIG. 3, as shown in block 306.

FIG. 4 diagrams the routine followed by the CPU 13 in receiving data from the interface unit 10. Periodically, the CPU 13 is caused, in a conventional manner such as by means of an internally generated interrupt, to enter the routine of FIG. 4, as shown in block 400. The CPU 13 reads the logical AVOT flag 31b, as shown in block 401, to determine if the AVOT flag 31b has been asserted by the microprocessor 20, as shown in block 402. If AVOT 31b is deasserted, indicating that the microprocessor 20 has not sent any information to the CPU 13, the CPU 13 exits the routine of FIG. 4, as shown in FIG. 406.

If, however, AVOT 31b is asserted, indicating that the microprocessor 20 has sent information to the CPU 13, the CPU 13 reads POT 30 via the CPU DATA bus 38, as shown in block 403, to retrieve therefrom the byte data sent by the microprocessor 20. The CPU 13 also reads COT 29, as shown in FIG. 404, to determine the channel 0-7 with which the byte of data originated. Then the CPU 13 asserts the logical ACIN flag 31a, as shown in block 405. As was described previously, assertion of ACIN 31a results in the deassertion of AVOT 31b, and thus signals the microprocessor 20 that the CPU 13 has retrieved the information from COT 29 and POT 30.

At that point, the CPU 13 is done receiving data from the interface module 10, and it exits the routine of FIG. 4, as shown in the block 406.

Unlike the CPU 13 and the microprocessor 20, the terminals 9 of the computer system 14 (see FIG. 1) are serial communicating devices, each capable of sending or receiving only one bit of data at a time. Hence, the channels 0-7 which connect the interface unit 10 to the terminals 9 are serial communication channels. Each channel 0 through 7 is a duplex channel, in that it comprises lines which provide separate paths for data moving in opposite directions. As shown in FIG. 2, from the viewpoint of the terminals 9 the channels 0 through 7 comprise transmit lines 0t through 7t which carry bits of data from the terminals 9 to the interface unit 10, and receive lines 0r through 7r which carry bits of data from the interface unit 10 to the terminals 9.

The channels 0-7 are asynchronous communication channels: they carry no clocking signals from the device transmitting thereon to the device receiving the transmissions that would indicate to the receiving device when it is time to sample the channel for a transmitted bit.

At the interface unit 10, the lines 0t through 7t of the channels 0 through 7 connect to inputs of an 8-bit wide three-state mode gate, which is designated in FIG. 2 as SIN (serial inputs) 25. Outputs of SIN 25 connect to the eight lines of the MP DATA bus 34, while the EN control input of SIN 25 connects to MP CONTROL line 37d. Generally, the line 37d is deasserted and the outputs of SIN 25 are disconnected from the inputs and repose in the Tristate level. When the microprocessor 20 is ready to receive data from the terminals 9, it causes the decoder and clock 23 to strobe the line 37d, thus causing each output of SIN 25 to become asserted high or low, depending upon the state of the channel line 0t-7t which is connected to the corresponding input of SIN 25. One bit of data from each terminal 9 is thus transferred onto the MP DATA bus 34, from where the microprocessor 20 can read and sample the data.

The lines 0r through 7r of the channels 0 through 7 connect to outputs of an 8-bit wide latch, which is designated in FIG. 2 as SOT (serial outputs) 26. Inputs of SOT 26 connect to the eight lines of the MP DATA bus 34. The CLK control input of SOT 26 is connected to MP CONTROL line 37e. When the microprocessor 20 wishes to transmit data to the terminals 9, it outputs the data, one bit for each terminal 9, on the MP DATA bus 34 and causes the decoder and clock to strobe the line 37e. Strobing of the line 37e causes the outputs of SOT 26 to become connected to the inputs to take on the state of the inputs, transferring the data from the MP DATA bus 34 to the lines 0r through 7r. The lines 0r through 7r carry the data to the respective terminals 9. When the line 37e is deasserted, the outputs of SOT 26 latch on to their current state and become disconnected from, nonresponsive to, the state of the SOT 26 inputs.

A random access memory (RAM) 22 of the interface unit 10 serves as temporary storage for data being transferred between the CPU 13 and the terminals 9, as well as other general scratch-pad storage purposes. Address inputs of the RAM 22 are connected to the MP ADDRESS bus 35, and signals received over the MP ADDRESS bus 35 select memory locations of the RAM 22. Selection of the RAM 22 from other devices, and selection of the "read" or "write" functions, is made by a pair of MP CONTROL lines 37a and b. The line 37b connects to the EN control input and the line 37a connects to th CLK control input of the RAM 22. Strobing of the line 37b causes a "read" operation to be performed in the RAM 22 while strobing of the line 37a causes a "write" operation to be performed.

The microprocessor 20 is programmed to function as an interface device. The interface program that executes on the microprocessor 20 is stored in a read only memory (ROM) 21. Address inputs of the ROM 21 are connected to the MP ADDRESS bus 35, and signals received over the MP ADDRESS bus 35 select memory locations of the ROM 21. Selection of the ROM 21 from other devices in the interface unit 10 is made by MP CONTROL line 37c which connects to the EN control input of the ROM 21. Data outputs of the ROM 21 connect to the eight lines of the MP DATA bus 34.

The interface program stored in ROM 21 and executing on the microprocessor 20 manipulates three groups of variables: channel 0-7 inputs and outputs, which are the contents of SIN 25 and SOT 26, respectively; CPU 13 inputs and outputs, which are the contents of CIN 27, PIN 28, COT 29, and POT 30 and the states of ACIN 31a, AVOT 31b, ACOT 32a, and AVIN 32b; and receive and transmit states, which are contents of selected storage locations of the RAM 22.

Figure 5:
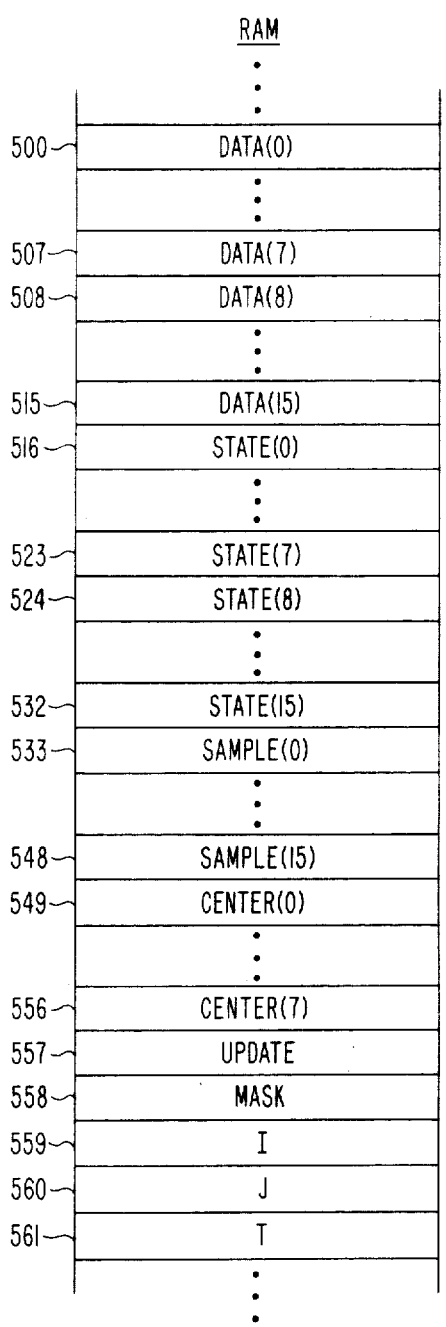
FIG. 5 is a block diagram of the logical configuration of the RAM of FIG. 2.

The channel 0-7 and CPU 13 input and output variables have already been discussed. The receive and transmit state variables are shown in FIG. 5 as occupying storage locations designated as 500 through 561 in the RAM 22. Each of the receive and transmit state variables is an 8-bit word. The functions of these variables are explained below in conjunction with the explanation of the operation of the interface program of the microprocessor 20. For clarity, the devices or memory locations utilized to implement the variables, and the variables which their contents represent, are referred to interchangeably by the same name.

The program treats the channel 0-7 input and output variables, as well as the state variables 500-561, as 8-bit quantities. In particular, both SIN 25 and SOT 26 are each treated as one eight-bit quantity rather than eight one-bit quantities, even though bit I of SIN 25 is the serial input from channel I and bit I of SOT 26 is the serial output to channel I, where $0 \leq I \leq 7$. If this were not done, the prgram would either have to pack inputs and unpack outputs or have to deal with doubly-subscripted sample variables.

The channels 0 through 7 have a predetermined Baud rate associated with them. The Baud rates for the channels 0 through 7 are assumed to be identical. The Baud rate is a measure of the number of bits per second that a channel can carry. Hence the Baud rate determines the amount of time allotted on a channel 0-7 for the duration of a single bit, referred to as a bit interval.

The interface program divides each bit interval into sixteen time slots. The microprocessor 20, under program control, begins each time slot with the performance of functions that must be performed more than once per bit interval for each channel 0 through 7. The bulk of each time slot is spent on activities that must be performed at most once per bit interval for each channel 0 through 7.

The program allocates two time slots per bit interval to each channel 0 through 7. The first time slot is used for functions associated with receipt of data bits from the selected channel 0 through 7 and transmittal thereof to the CPU 13, while the second time slot is used for functions associated with receipt of data from the CPU 13 and transmittal thereof to a terminal 9 on the selected channel 0 through 7. The computational load of the microprocessor 20 is distributed across the time slots in order to decrease the computation speed required to service a fixed number of channels 0-7.

Referring to FIG. 5, consecutive time slots are kept track of by a recirculating counter variable I, where the value of I ranges from 0-15. Conveniently, the value of I also indicates the channel 0-7 which is currently being serviced. While for purposes of receive functions, during the first eight time slots of a bit interval, the channels 0-7 each have the corresponding value 0-7 of I, respectively, associated with them, for purposes of transmit functions, during the last eight time slots of a bit interval, the channels 0-7 each have a value 8-15 of I, respectively, associated with them. Thus for transmit functions, the number of a channel 0-7 corresponds to the value of I less 8.

The program is timed by an interrupt that signals the beginning of a time slot. At the beginning of each time slot, the program causes the microprocessor 20 to output an updated value of SOT 26, and to input a sampled value of SIN 25. The serial output data is updated immediately after the interrupt to provide maximum bit timing accuracy. The serial input data is sampled next to ensure equal spacing. The updated value of SOT 26 is retrieved from UPDATE, while the sample of SIN 25 is recorded as SAMPLE(I).

How the bulk of each time slot is spent is determined by the value of STATE(I). The values that STATE(I) can take reflect the communication protocol of the channels 0-7. Data is communicated on each channel 0-7 in the form of a word, or byte, comprising eight consecutive data bits. Each data word is immediately preceded by a start bit which has a logical value of 0. Each data word is immediately followed by two consecutive stop bits which have a logical value of 1. The logical value of a channel 0-7 when it is idle is likewise 1. In light of this communication protocol, the values of STATE(I) are defined as follows:

a value of 0 means idle channel,
a value of 1 means start,
a value of 2 through 9 means data, and
a value of 10 and 11 means stop.

These meanings are the same for both receive functions, $0 \leq I \leq 7$, and transmit functions, $8 \leq I \leq 15$.

In order to detect the start bit on an idle channel 0-7, each channel 0-7 is sampled and the sample is recorded during each time slot. The sixteen samples recorded for channel I since it was last serviced will include the sample J where channel 1 become busy, i.e., where the interface 10 received its first sample of logical value 0 from the channel I. There are two ways in which reception can begin. The sixteen samples will either include 1 to 8 samples of the start bit or 9 to 16 samples of the start bit. The program must distinguish the two cases and perform different actions.

The scanning of the samples to detect the start bit makes reception from the channels 0-7 require much more computation than transmission on the channels 0-7. This computational burden is reduced by an efficient binary search that helps to equalize the average number of calculations per time slot. The effect is to increase the number of channels 0-7 that can be serviced for a fixed computation speed.

The sample scanning routine is executed during each receive time slot where the channel I is idle. The start bit can begin at any one of the sixteen samples. It is not necessary to examine all sixteen samples to find out whether or not there is a start bit. Two of the sixteen samples are tested to ascertain the presence of a start bit. Five of the sixteen samples are tested to establish the center of the start bit. The computations that must be performed more than once per bit interval are optimized by the program. This avoids a computational bottleneck by reception.

The presence of a start bit can usually be determined by examining only the most recent sample. The exception is a start bit that is captured by just fifteen samples, because of bit framing, or by fourteen samples, because of pulse shrinkage and/or phase jitter. The exceptions are covered by examining the eighth sample back since this is guaranteed to find any start bit that the most recent sample misses. The scanning routine also rejects false starts by verifying that the start bit is still present at the center of the bit interval. This must sometimes be done during the same time slot in which the start bit is detected.

Samples taken during time slots J+8 modulo 16, where J is the time slot during which a channel I became busy, are treated as the middle, or center, of bits received from channel I and therefore they are taken to represent the true value of those bits. The slot J+8 modulo 16 that corresponds to the middle of a bit received from channel I is recorded as CENTER(I), $0 \leq I \leq 7$. The program continues to sample each channel 0-7 and to record the samples during each time slot even after the start bit is detected. This requires less time than the bookkeeping necessary to record only the one sample in sixteen of each channel 0-7 that will actually be used.

Center samples of data bits received from a channel I are shifted into DATA(I), $0 \leq I \leq 7$. The bit sample of a channel I is selected and picked off from a sample of all channels 0-7 by the value of MASK which has a logical one at bit position I, $0 \leq I \leq 7$, and zeros at the other bit positions. T serves as temporary storage for a sample while it is being manipulated.

When a byte is received across a channel I, it is output to the CPU 13 when ACIN 31a indicates that the CPU 13 has acknowledged receipt of the last byte sent to it. Then the microprocessor 20 outputs DATA(I) as POT 30 and I is output as COT 29. AVOT 31b is also asserted to indicate to the CPU 13 that a byte is available.

When a byte is transmitted by the CPU 13, it is input by the microprocessor 20 when AVIN 32b indicates that the CPU 13 has made a byte available and when CIN 27 is input and found to be of the same value as I. Then PIN 28 is input as DATA(I), $8 \leq I \leq 15$. ACOT 32a is also asserted to indicate to the CPU 13 that the byte has been input. A data bit is picked off by MASK from DATA(I), $8 \leq I \leq 15$, and is transferred into UPDATE for transmission on a channel (I-8). T again serves as temporary storage for the contents of DATA(I) while they are being manipulated. The program changes the output for channel (I-8) during time slot I. This requires less time than the bookkeeping necessary to change on the time slot during which the byte became available. The delay in transmission is at most one bit interval.

The structure of the interface program is diagrammed in flowchart form in FIGS. 6 through 18.

Figure 6:
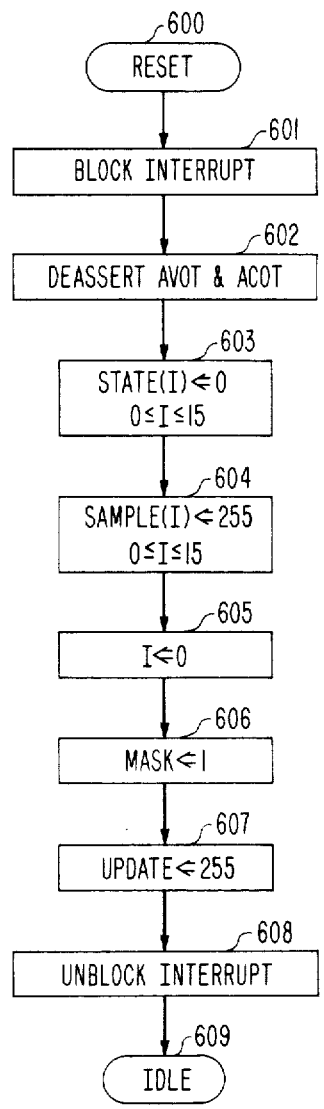

When the interface unit 10 is turned on, the microprocessor 20 first executes an initialization routine, which is diagrammed in FIG. 6. The microprocessor 20 is caused to enter the initialization routine by a conventional reset signal, as shown in block 600, that occurs at power-on. The microprocessor 20 first makes sure that it cannot be interrupted during execution of the initialization routine by blocking interrupts, as shown in FIG. 601. The microcomputer 20 then deasserts AVOT 31b and ACOT 32a to indicate that it has neither accepted any information from the CPU 13 nor sent any information to the CPU 13. The microprocessor 20 also sets to zero all STATE(I) variables, as shown in block 603, to indicate to itself that it considers all channels 0 through 7 to have been previously idle. Correspondingly the microprocessor 20 loads all SAMPLE(I) variables with 255, as shown in block 604, to set to one all bits of all SAMPLE(I) variables to indicate that as far as the interface unit 10 is concerned, the channels 0-7 have been idle.

The microprocessor 20 then resets the variable I, as shown in block 605, to start servicing of the channels 0 through 7 with the channel 0. As shown in block 606, the microprocessor 20 correspondingly loads the variable MASK with 1 to set all but its first bit to zero and thus to ready MASK for servicing channel 0. And the microprocessor 20 loads the variable UPDATE with 255, as shown in block 607, to set all of its bits to 1 and thus to initially send a 1 across each channel 0 through 7, thereby indicating to the terminals 9 that the channels 0-7 are idle. Having completed initialization, the microprocessor 20 unblocks interrupts, as shown in block 608, and then enters an idle state, as shown in block 609, where it awaits occurrence of an interrupt.

An interrupt is generated, in a conventional manner, in the microprocessor 20 sixteen times in each bit interval, to mark the time slots. When the microprocessor 20 is in the idle state 609, upon the occurrence of an interrupt the microprocessor 20 enters the interrupt handling routine of FIG. 7, as shown by block 700.

As shown in block 701, at the beginning of a time slot the microprocessor 20 loads the contents of UPDATE into SOT 26, and thereby outputs the updated value of SOT onto the channels 0-7, as shown in block 702, to transmit one bit of SOT 26 to each terminal 9. The microprocessor 20 then inputs the current value of SIN 25, as shown in block 703, to obtain a sample value of the current transmissions of the terminals 9 from the channels 0-7, and stores the value of SIN 25 in SAMPLE(I), as shown in FIG. 704.

The microprocessor 20 then checks the value of I, as shown in block 705, to determine if this time slot is one of eight consecutive time slots referred to as a receive cycle and dedicated to manipulating information received from the channels 0-7 for transfer to the CPU 13, or whether it is one of eight consecutive time slots referred to as a transmit cycle and dedicated to manipulating information obtained from the CPU 13 for transmission on the channels 0-7. If the value of I is not greater than 7, a receive cycle is indicated and the microprocessor 20 enters a receive routine, as shown in block 706.

If the value of I is greater than 7, a transmit cycle is indicated and the microprocessor 20 enters a transmit routine, as shown in block 707.

The receive routine is diagramed in FIG. 9. As shown by block 900, it is entered whenever a receive cycle is indicated at the block 705 of FIG. 7. In the receive routine the microprocessor 20 first checks the value of STATE(I), as shown in block 901, where I indicates the channel 0-7 being serviced. If the state of the channel I is zero, indicating that the channel I is idle, the microprocessor proceeds to block 902.

If the state of the channel I is not zero, indicating that the channel I is not idle, the microprocessor 20 checks whether the state is 1, as shown in block 910, indicating that a start bit has been received across that channel I. If so, the microprocessor 20 enters a receive start routine, as shown in block 913. If the state is not 1, the microprocessor 20 checks whether the state is greater than 9, as shown in block 911, indicating that stop bits are being received across the channel I. If so, the microprocessor enters a receive stop routine, as shown in block 914. And if the state is greater than 1 but less than 9, indicating that data bits are being received across the channel I, the microprocessor 20 enters a receive data routine, as shown in block 912.

Turning to operations which the microprocessor 20 performs upon finding the channel I idle, i.e., STATE(I) equal to zero, the microprocessor 20 proceeds to perform a binary search in order to determine whether any bit has been received by the interface unit 10 during the current bit interval, and if so, to find the center time slot of the bit interval.

As shown in the block 902, the microprocessor 20 decrements the value of I by 8, performs a modulo 16 operation on the decremented value of I, and stores the result in the variable J. J thus points 8 time slots, or one half-bit interval, behind the current time slot pointed to by I. As shown in block 903, the microprocessor 20 then retrieves the values of SAMPLE(J) and of MASK, performs an AND operation on them, and stores the result in variable T. As MASK has zeros at all bit positions but the one corresponding to the bit if SIN 25 associated with the channel I that is currently being serviced, and SAMPLE(J) has the value of SIN 25 that was sampled one half bit interval ago, the result is that T holds the value received by the interface unit 10 from the channel I one half bit interval ago.

As shown in block 904, the microprocessor 20 checks the value of T to determine if it is zero. If so, the microprocessor 20 "knows" that the first zero sample may have been received earlier than one half bit interval ago, and the microprocessor 20 enters a scanleft routine of the binary search, as indicated in block 908, to look for the first zero sample. If the value of T is nonzero, the microprocessor 20 "knows" that the first zero sample, if any, was received later than one half bit interval ago, and the microprocessor 20 proceeds to look for the first zero sample. As shown in block 905, the microprocessor 20 retrieves the values of SAMPLE(I), which is the last value of SIN sample, and of MASK, performs an AND operation on them, and stores the result in variable T. T thus holds the value just received by the interface unit 10 from the channel I.

As shown in block 906, the microprocessor 20 again checks the value of T to determine if it is zero. If the value of T is nonzero, the microprocessor 20 "knows" that no zero samples have been received from the channel I during the past one half bit time and that the channel I remains idle, i.e., in STATE(I) of zero. The microprocessor 20 therefore leaves the binary search and proceeds to execute an exit routine, as indicated by block 907. If the value of T is found to be zero in block 906, the microprocessor 20 "knows" that the first zero sample may have been received earlier than during the last time slot, and the microprocessor 20 enters a scanright routine of the binary search, as indicated in block 909, to look for the first zero sample within the last one half bit interval.

Figure 13:
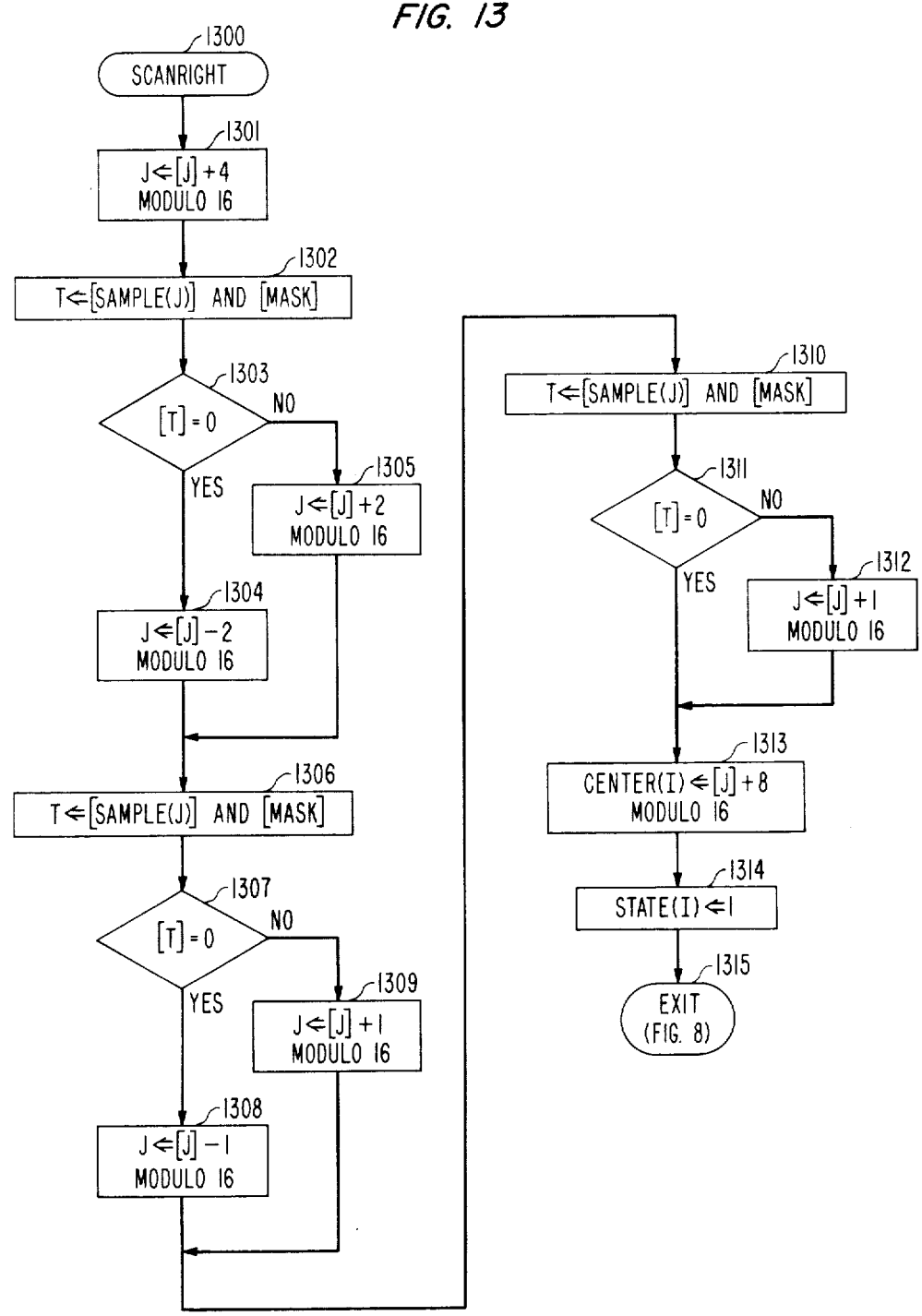
Figure 14:
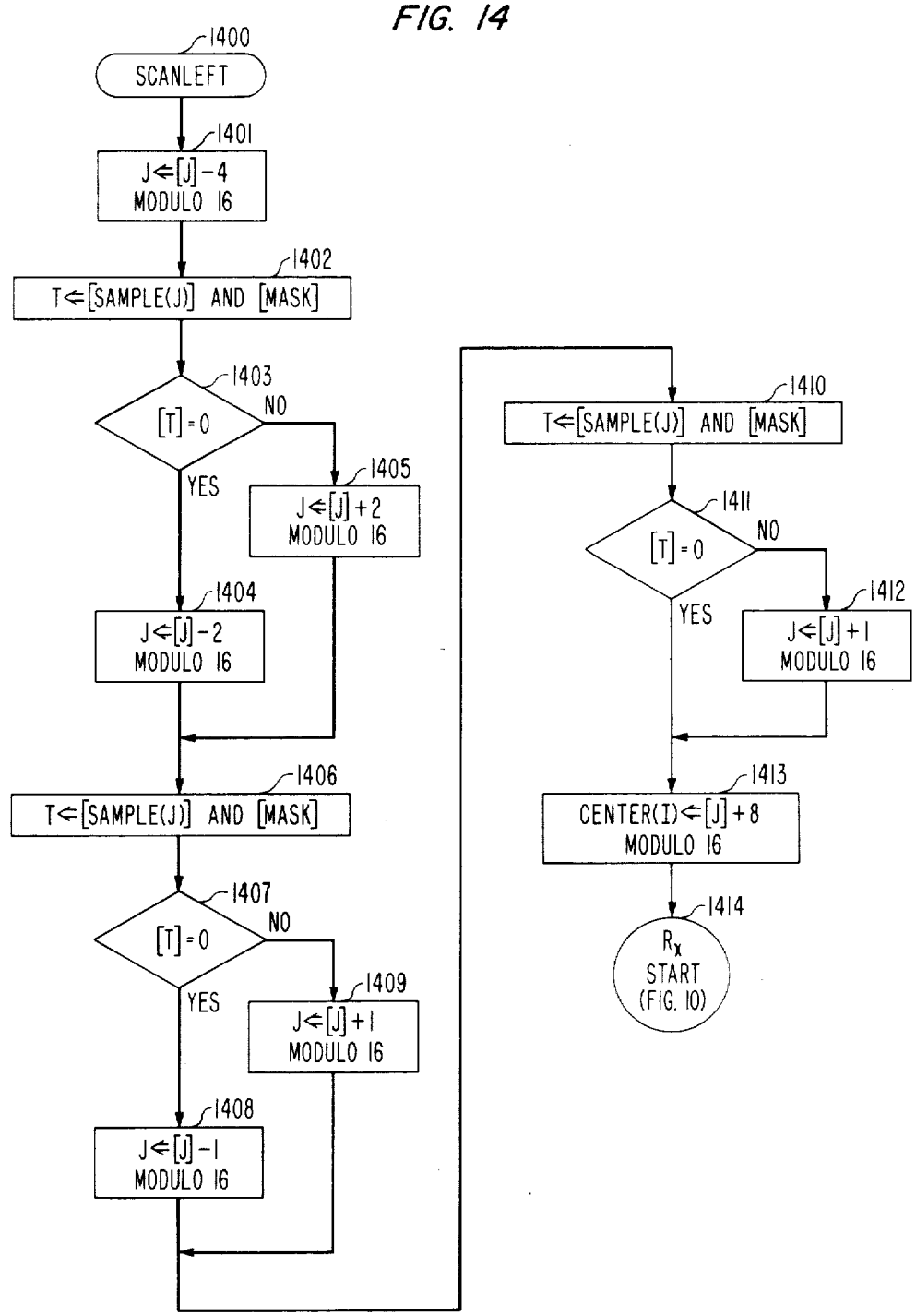

The scanright routine is flowcharted in FIG. 13. As shown by block 1300, it is entered by the microprocessor 20 upon encounter of a scanright condition. The microprocessor 20 takes J, which currently points one half bit time behind the current time slot I (see block 902 of FIG. 9), increments J by four, performs a modulo 16 operation on the incremented value of value of J, and stores the result back in J, to point J one quarter bit time behind the current time slot I.

As shown in block 1302, the microprocessor 20 then retrieves the values of SAMPLE(J) and of MASK, performs an AND operation on them, and stores the result in T. As MASK has zeros at all bit positions but the one corresponding to the bit of SIN 25 associated with the channel I that is currently being serviced, and SAMPLE(J) has the value of SIN 25 that was sampled one quarter bit interval ago, the result is that T holds the value received by the interface unit 10 from the channel I one quarter bit interval ago.

As shown in block 1303, the microprocessor 20 checks the value of T to determine if it is zero. If so, the microprocessor 20 "knows" that the first zero sample may have been received earlier than one quarter bit interval ago. The microrocessor 20 therefore decrements J by 2, performs a modulo 16 operation on the decremented value of J, and stores the result in J, as indicated in block 1304, to point J six time slots, or three eighths bit interval, behind the current time slot I.

If, however, the value of T is found to be nonzero in the block 1303, the microprocessor 20 "knows" that the first zero sample was received later than one quarter bit interval ago. The microprocessor 20 therefore increments J by 2, performs a modulo 16 operation on the incremented value of J, and stores the result in J, as indicated in block 1305, to point J two time slots, or one eighth bit interval, behind the current time slot I.

From either the block 1304 or the block 1305 the microprocessor 20 proceeds to block 1306, where it again retrieves the value of SAMPLE(J) and of MASK, performs an AND operation on them, and stores the result in T. Then again the microprocessor 20 checks the value of T to determine if it is 0, as shown in block 1307.

If the value of T is zero, the microprocessor 20 "knows" that the first zero sample may have been received in the earlier time slot. Therefore the microprocessor 20 decrements J by one, performs a modulo 16 operation on the decremented value of J, and stores the result in J, as shown in block 1308.

If the value of T is not found to be zero in the block 1307, the microprocessor 20 "knows" that the first zero sample was received in a later time slot. Therefore the microprocessor 20 increments J by one, performs a modulo 16 operation on the incremented value of J, and stores the result in J, as shown in block 1309.

From either the block 1308 or the block 1309 the microprocessor 20 proceeds to block 1310, where it retrieves the value of SAMPLE(J) and of MASK, performs an AND operation on them, and stores the result in T. Then the microprocessor 20 again checks the value of T to determine if it is 0, as shown in block 1311.

If the value of T is zero, the microprocessor 20 "knows" that it has found the time slot during which the first zero sample was received during the current bit interval from the channel I, and the microprocessor 20 proceeds to block 1313.

If the value of T is not found to be zero in the block 1311, the microprocessor 20 "knows" that the time slot after the time slot J is when the first zero sample was received during the current bit interval from the channel I, so the microprocessor increments the value of J by 1, performs a modulo 16 operation on the incremented value of J, and stores the result in J, as shown in block 1312. The microprocessor 20 then proceeds to block 1313.

Having found the time slot J during which the first zero sample was received from the channel I, and thereby having completed the binary search, the microprocessor 20 increments J by 8, or one half bit interval, performs a modulo 16 operation on the incremented value of J to obtain the time slot which will be the center of the bit intervals for the channel I during this transmission, and stores the result in CENTER(I), all as shown in block 1313.

Under the communication protocol of the channels 0-7 which was described above, the first zero bit received across a channel by the interface unit 10 is the start bit. The microprocessor 20 therefore sets STATE(I) to one, as shown in block 1314, to indicate that a start bit is being received from the channel I. The microprocessor 20 then leaves the scanright routine of FIG. 13 and enters the exit routine, as indicated in block 1315.

As was mentioned above, should the microprocessor 20 find T equal to zero in block 904 of FIG. 9, it "knows" that the first zero sample was received from the channel I prior to the last one half bit interval, and the microprocessor 20 enters the scanleft routine of the binary search to look for the first zero sample. The scanleft routine is flowcharted in FIG. 14. It directly parallels the scanright routine of FIG. 13. As shown by block 1400, the scanleft routine is entered by the microprocessor 20 upon encounter of a scanleft condition. The microprocessor 20 takes J, which currently points one half bit time behind the current time slot (see block 902 of FIG. 9), decrements J by four, performs a modulo 16 operation on the decremented value of J, and stores the result back in J, as indicated in block 1401, to point J three quarters bit interval behind the current time slot I.

As shown in block 1402, the microprocessor 20 then retrieves the values of SAMPLE(J) and of MASK, performs an AND operation on them, and stores the result in T. As MASK has zeros at all bit positions but the one corresponding to the bit of SIN 25 associated with the channel I that is currently being serviced, and SAMPLE(J) has the value of SIN 25 that was sampled three quarters bit interval ago, the result is that T holds the value received by the interface unit 10 from the channel I three quarters bit interval ago.

As shown in block 1403, the microprocessor checks the value of T to determine if its is zero. If so, the microprocessor 20 "knows" that the first zero sample may have been received earlier that three quarters bit interval ago. The microprocessor 20 therefore decrements J by 2, performs a modulo 16 operation on the decremented value of J, and stores the result in J, as indicated by block 1404, to point J fourteen time slots, or seven eighths bit interval, behind the current time slot I.

If, however, the value of T is found to be nonzero in the block 1403, the microprocessor 20 "knows" that the first zero sample was received later than three quarters bit interval ago. The microprocessor 20 therefore increments J by 2, performs a modulo 16 operation on the incremented value of J, and stores the result in J, as indicated in block 1305, to point J ten time slots, or five eighths bit interval, behind the current time slot I.

From either the block 1404 or the block 1405 the microprocessor 20 proceeds to block 1406, where it again retrieves the values of SAMPLE(J) and of MASK, performs an AND operation on them, and stores the result in T. Then the microprocessor 20 checks the value of T to determine if it is 0, as shown in block 1407.

If the value of T is zero, the microprocessor 20 "knows" that the first zero sample may have been received in the earlier time slot. Therefore the microprocessor 20 decrements J by one, performs a modulo 16 operation on the decrements value of J, and stores the result in J, as shown in block 1408.

If the value of T is not found to be zero in the block 1407, the microprocessor 20 "knows" that the first zero sample was received in a later time slot. Therefore the microprocessor 20 increments J by one, performs a modulo 16 operation of the incremented value of J, and stores the result in J, as shown in block 1409.

From either the block 1408 or the block 1409 the microprocessor 20 proceeds to block 1410, where it retrieves the values of SAMPLE(J) and of MASK, performs an AND operation on them, and stores the result in T. Then the microprocessor 20 again checks the value of T to determine if it is 0, as shown in block 1411.

If the value of T is zero, the microprocessor 20 "knows" that it has found the time slot J during which the first zero sample was received during the current bit interval from the channel I, and the microprocessor 20 proceeds to block 1413.

If the value of T is not found to be zero in the block 1411, the microprocessor 20 "knows" that the time slot after the time slot J is when the first zero sample was received during the current bit interval from the channel I, so the microprocessor increments the value of J by one, performs a modulo 16 operation on the incremented value of J, and stores the result in J, as shown in block 1412. The microprocessor 20 then proceeds to block 1413.

Having found the time slot J during which the first zero sample was received from the channel I, and thereby having completed the binary search, the microprocessor 20 increments J by 8, or one half bit interval, performs a modulo 16 operation on the incremented value of J to obtain the time slot which is the center of the bit interval for the channel I during this transmission, and stores the result in CENTER(I), all as shown in block 1413. The microprocessor 20 then leaves the scanleft routine of FIG. 14 and enters the receive start routine, as shown in block 1414.

Figure 10:
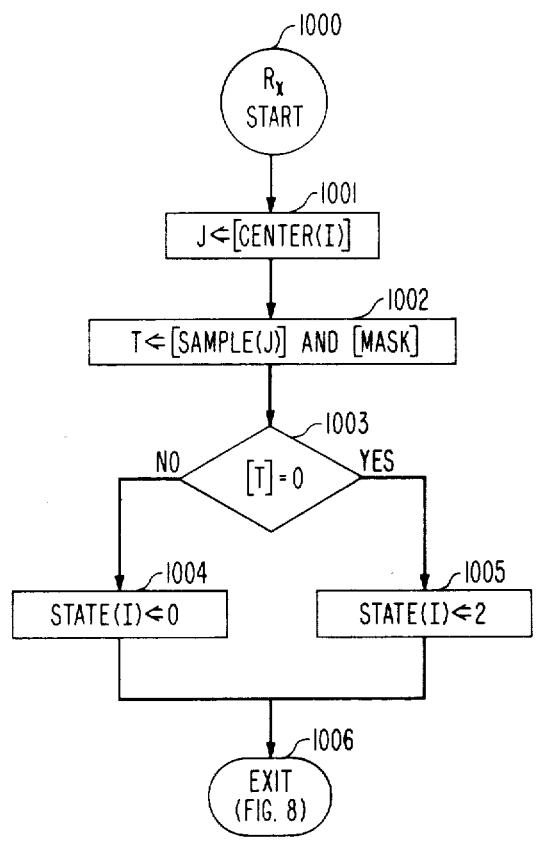

The receive start routine is flowcharted in FIG. 10. It is entered when the microprocessor 20 encounters a receive start condition, as shown in block 1000, at the end of the scanleft routine (see block 1414 of FIG. 14) or upon finding STATE(I) to be one in the receive routine (see block 910 of FIG. 9), as was discussed above.

In the receive start routine of FIG. 10, the microprocessor 20 retrieves from CENTER(I) the time slot marking the center of bit intervals for channel I during this transmission and stores it in J, as shown in block 1001. As shown in block 1002, the microprocessor 20 then retrieves the values of SAMPLE(J) and of MASK, performs an AND operation on them, and stores the result in T. As SAMPLE(J) contains the value of SIN 25 that was obtained during the last central time slot of the bit interval for channel I and MASK has zeros at all bit positions but the one corresponding to the bit of SIN 25 associated with the channel I that is currently being serviced, the result is that T holds the bit value received by the interface unit 10 from the channel I during the time slot marking the center of the channel's bit interval.

As shown in block 1003, the microprocessor 20 then checks the value of T to determine if it is zero. If not, the microprocessor 20 "recognizes" that the zero value of T previously found for this channel 0–7, i.e., for channel I, during the binary search was a noise glitch and not a bit transmitted by a terminal 9 over the channel I. The microprocessor 20 therefore resets STATE(I) to zero, as shown in block 1004, to indicate that the channel I is idle, and then leaves the receive start routine of FIG. 10 for the exit routine, as shown in block 1006.

If the value of T is found to be zero in the block 1003, the microprocessor 20 "recognizes" the zero value to be a start bit transmitted over the channel I. The microprocessor 20 therefore sets STATE(I) to two, as shown in block 1005, to indicate that a start bit has been received by the interface unit 10 over the channel I and data is forthcoming, and then leaves the receive start routine of FIG. 10 for the exit routine, as shown in block 1006.

As was mentioned above in conjunction with the discussion of block 912 of FIG. 9, the microprocessor 20 enters the receive data routine when it finds STATE(I) of the channel I to equal any number from 2 through 9. Each of these values of STATE(I) is associated with the receipt by the interface unit 10 of a bit of the eight data bits that are transmitted by a terminal 9 after a start bit and before two stop bits under the communication protocol of the channels 0–7.

Figure 11:
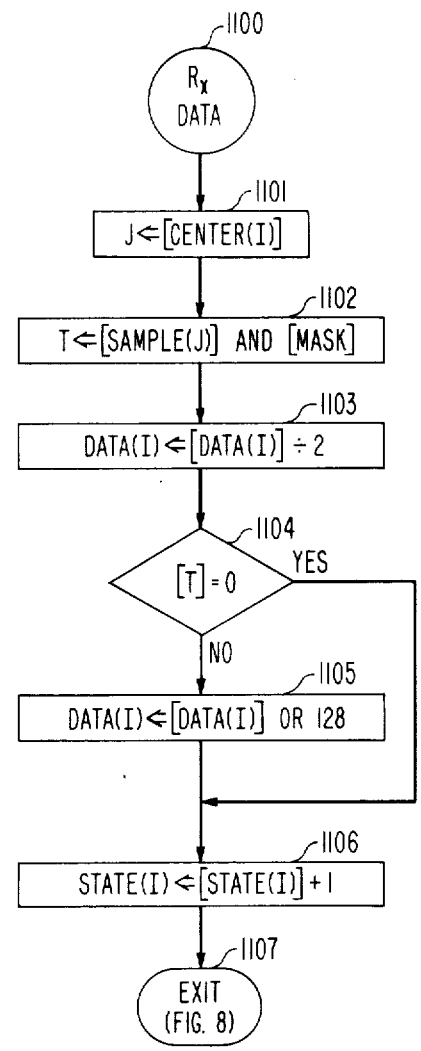

The receive data routine is flowcharted in FIG. 11. It is entered when the microprocessor 20 encounters a receive data condition, as shown in block 1100. The microprocessor 20 first retrieves from CENTER(I) the time slot marking the center of the bit interval for channel I and stores it in J, as shown in block 1101. As shown in block 1102, the microprocessor 20 then retrieves the values of SAMPLE(J) and of MASK, performs an AND operation on them, and stores the result in T. As SAMPLE(J) contains the value of SIN 25 that was obtained during the central time slot of a data bit interval for channel I and MASK has zeros at all bit positions but the one corresponding to the bit of SIN 25 associated with the channel I that is currently being serviced, the result is that T holds the data bit received by the interface unit 10 from the channel I during the time slot marking the center of that data bit interval.

As shown in block 1103, the microprocessor 20 responds to the receipt of a data bit by retrieving the value of DATA(I), dividing it by two, and storing the result back in DATA(I). DATA(I) holds the data bits received from the channel I since the receipt of the start bit. Dividing DATA(I) by two shifts the contents of DATA(I) by one bit position to the right, carrying a zero into the most significant bit of DATA(I) and freeing that most significant bit for storage of the data bit just received over the channel I.

The microprocessor 20 then checks the value of T derived in the block 1102, to determine if the data bit is a zero or a one, as shown in block 1104. If the value of T is zero, that value has already been loaded into DATA(I) by the division operation of the block 1103 and so the microprocessor continues to block 1106.

If however, the value of T is not zero, the value of the received bit is a one and the microprocessor 20 packs a one into the most significant bit of DATA(I) by ORing the contents of DATA(I) with 128 and storing the result back in DATA(I), as shown in block 1105. The processor 20 then continues to block 1106.

As shown in block 1106, the microprocessor 20 marks the receipt of the data bit from the channel I by incrementing STATE(I) by one. The microprocessor 20 then leaves the receive data routine of FIG. 11 for the exit routine, as shown in block 1107.

As was mentioned above in conjunction with the discussion of block 911 of FIG. 9, the microprocessor 20 enters the receive stop routine when it finds STATE(I) of the channel I to be greater than 9, that is, when eight consecutive data bits have been received across the channel I. Each of these values of STATE(I) is associated with the receipt by the interface unit 10 of one bit of the two stop bits that are transmitted by a terminal 9 to signal the end of data bit transmissions.

Figure 12:
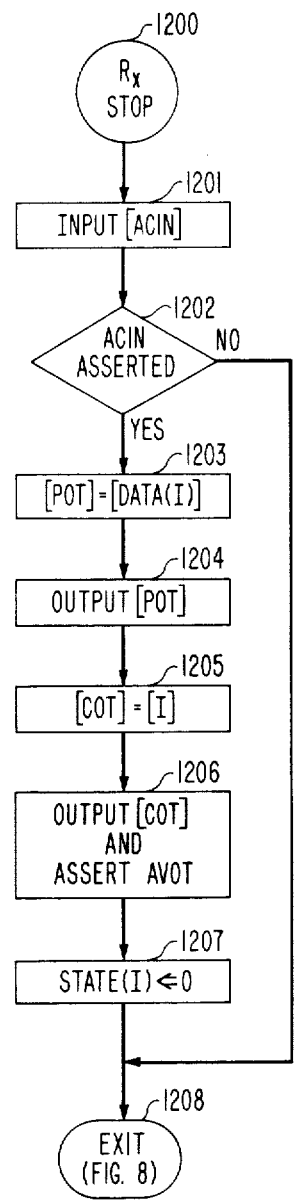

The receive stop routine is flowcharted in FIG. 12. It is entered when the microprocessor 20 encounters a receive stop condition, as shown in block 1200. The microprocessor 20 first reads the state of ACIN 31a, as indicated in blocks 1201, and checks whether it is asserted, as indicated in block 1201, to determine if data may be sent to the CPU 13. If ACIN 31a is deasserted, indicating that information previously sent the CPU 13 has not been accepted thereby, the microprocessor 20 leaves the receive stop routine of FIG. 12 and enters the exit routine, as indicated by block 1208.

If ACIN 31a is asserted, it indicates that information, if any, that was previously sent to the CPU 13 is not awaiting acceptance by the CPU 13 and that POT 30 and COT 29 (see FIG. 2) are available for use in transferring a byte of data to the CPU 13. The microprocessor 20 therefore retrieves the data values to be placed in POT 30 from DATA(I), as shown in block 1203, and outputs those data values, loading POT 30 therewith, as shown in block 1204. To indicate to the CPU 13, via COT 29, the channel 0–7 from which the data in POT 30 originated, the microprocessor 20 retrieves the number of the channel I to be placed in COT 29 from I, as shown in block 1205, and outputs the channel number, loading COT 29 therewith and also asserting AVOT 31b, as indicated in block 1206. The assertion of AVOT 31b deasserts ACIN 31 and thus an indication is provided to both the microprocessor 20 and to the CPU 13 that information is waiting for retrieval by the CPU 13 in COT 29 and POT 30.

As shown in block 1207, the microprocessor 20 resets STATE(I) to zero to indicate that the receipt and transfer of a byte of data has been completed, and that the channel I is considered to have returned to the idle state. The microprocessor 20 then leaves the receive stop routine of FIG. 12 and proceeds to the exit routine, as shown in block 1208.

The exit routine is flowcharted in FIG. 8. It is executed whenever the microprocessor 20 encounter the exit condition, as shown in block 800. As shown in block 801, the microprocessor 20 increments the value of I by one, performs a modulo 16 operation on the incremented value of I, and stores the result back in I. I is thus set to contain the number of the next channel to be serviced, during the next time slot.

As shown in block 802, the microprocessor 20 next multiplies the value of MASK by 2, to shift the one nonzero bit of MASK by one bit position to correspond with the bit position in SIN 25 and SOT 26 of the channel I which will be serviced next. The microprocessor 20 then checks the value of I to determine if it is zero or eight, as shown in block 803. These values of I indicate that all of the channels 0–7 have already been serviced and that the channel 0 is again the next channel to be serviced. Therefore the microprocessor 20 resets the value of MASK to one, as shown in block 804, to rotate the one nonzero bit of MASK into the first bit position, which is associated in SIN 25 and SOT 26 with the channel 0. If the value of I is not zero or eight, no such resetting of the value of MASK is required, as all channels 0–7 have not yet been serviced.

The microprocessor 20 then leaves the exit routine of FIG. 8 and returns to the idle state, as indicated by block 805, in which state it awaits the receipt of the next interrupt.

Returning now to FIG. 7, the microprocessor 20 enters the receive routine at the block 705 eight times in succession during one bit interval, at every pass performing the receive functions for one channel 0–7 and therefore servicing all channels 0–7 in succession but during a single bit interval. Because the channels 0–7 and terminals 9 do not "recognize" a time period shorter than a bit interval, from their viewpoint they are being serviced by the interface unit 10 simultaneously.

Having performed the receive functions for all of the channels 0–7, the microprocessor 20 finds the value of I to be greater than 7 in the block 705. The start of a transmit cycle is thus indicated and the microprocessor 20 enters the transmit routine, as shown by the block 707.

Figure 15:
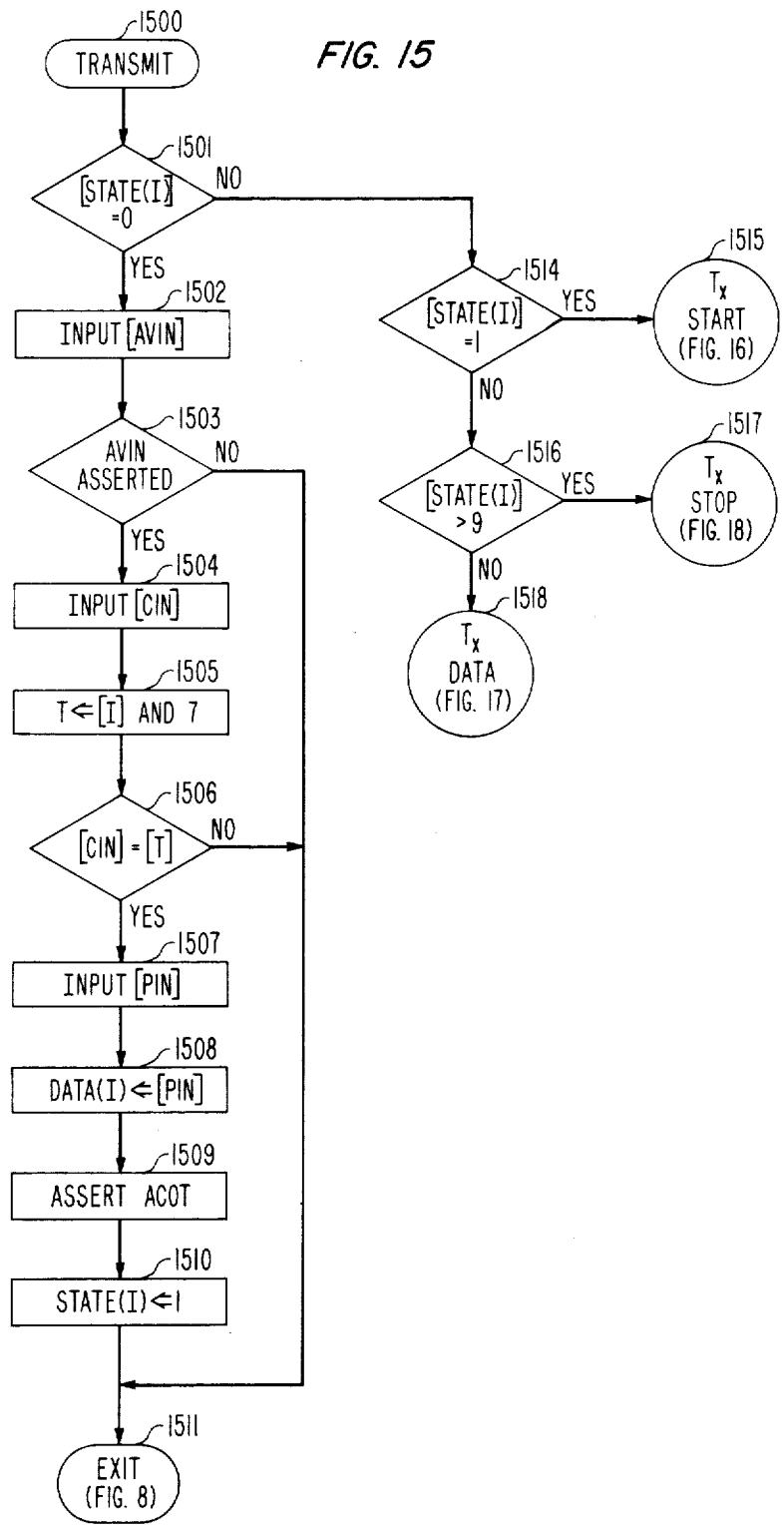

The transmit routine is diagramed in FIG. 15. As shown in block 1500, it is entered whenever a transmit cycle is indicated at the block 705 of FIG. 7. In the transmit routine the microprocessor 20 first checks the value of STATE(I), as shown in block 1501, where I indicates the channel 0–7 being serviced. As was mentioned above, for purposes of the transmit cycle, the channels 0–7 are referred to by values of I from 8 to 15, respectively. Thus, for purposes of the transmit cycle a channel number equals (I-8). If the state of the channel (I-8) is found to be zero in the block 1501, indicating that the channel (I-8) is idle, the microprocessor 20 proceeds to block 1502.

If the state of the channel (I-8) is not zero, indicating that the channel (I-8) is not idle, the microprocessor 20 checks whether the state is 1, as shown in block 1514, which would indicate that a start bit is to be transmitted by the interface unit 10 on the channel (I-8). If so, the microprocessor enters a transmit start routine, as shown in block 1615. If the state of the channel (I-8) is not 1, the microprocessor 20 checks whether the state is greater than 9, as shown in block 1516, which would indicate that stop bits are to be transmitted by the interface unit 10 on the channel (I-8). If so, the microprocessor enters a transmit stop routine, as shown in block 1517. And if the state is greater than 1 but less than 9, indicating that data bits are to be transmitted on the channel (I-8), the microprocessor 20 enters a transmit data routine, as shown in block 1518.

Turning to operations which the microprocessor 20 performs upon finding the channel (I-8) idle, i.e., STATE(I) is found to equal zero in the block 1501, the microprocessor 20 proceeds to accept information from the CPU 13. The microprocessor 20 reads the state of AVIN 32b, as shown in block 1502, and checks whether AVIN 32b is asserted, as shown in block 1503, to determine if information from the CPU 13 is ready for input by the microprocessor 20. If AVIN 32b is deasserted, indicating that no information has been sent by the CPU 13, the microprocessor 20 leaves the transmit routine of FIG. 15 and proceeds to the exit routine, as shown by block 1511.

If AVIN 32b is asserted, indicating that the CPU 13 has placed information in CIN 27 and PIN 28, the microprocessor 20 inputs CIN 27, as shown in block 1504, to obtain therefrom the number of the channel 0–7 for which data in PIN 29 is intended. The microprocessor 20 then takes the value of I, performs an AND operation with the number 7 thereon to get the number of the channel (I-8) currently being serviced, and places the result in T, as shown in block 1505. The microprocessor 20 then compares the number retrieved from CIN 27 with the contents of T, as shown in block 1506, to determine whether the data byte in PIN 29 is intended for the channel (I-8) currently being serviced. If not, the microprocessor 20 leaves the transmit routine of FIG. 15 and proceeds to the exit routine, as shown in the block 1511.

If the data in PIN 29 is intended for the channel (I-8), the microprocessor 20 inputs the byte of data from PIN 29, as shown in block 1507, and stores it in DATA(I), as shown in block 1508. The microprocessor 20 then asserts ACOT 32a to acknowledge to the CPU 13 receipt of the contents of CIN 28 and PIN 29, as shown in block 1509.

As the interface unit 10 now contains a byte of data for transmission on channel (I-8), the microprocessor 20 sets STATE(I) to 1, as shown in block 1510, to indicate readiness to begin transmission on the channel (I-8) by sending a start bit. The microprocessor 20 then leaves the transmit routine of FIG. 15 for the exit routine, as shown in the block 1611.

Figure 16:
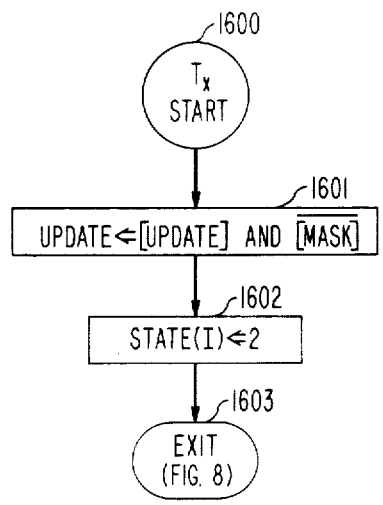

The transmit start routine is flowcharted in FIG. 16. The microprocessor 20 enters the transmit start routine upon encounter of a transmit start condition, as shown in block 1600, when it finds STATE(I) of the channel (I-8) to be one (see block 1514 of FIG. 15). As shown in block 1601, the microprocessor 20 retrieves the values of UPDATE and of MASK and performs an AND operation on the contents of UPDATE and the inverse of the value of MASK, storing the result back in UPDATE. UPDATE holds one bit of data for each channel 0–7 to be transmitted next on the channels 0–7, and MASK has zeros in all bit positions but the one corresponding to the bit of SOT 26 associated with the channel (I-8) currently being serviced. Therefore the inverse value of MASK has ones in all bit positions but the one associated with the channel (I-8) and the AND operation forces the bit of UPDATE associated with the channel (I-8) to zero to indicate a start bit, leaving the other bits of UPDATE unchanged.

As shown in block 1602, the microprocessor 20 sets the value of STATE(I) to equal two, indicating readiness to start transmitting data bits across the channel (I-8). The microprocessor 20 then leaves the transmit start routine of FIG. 16 and enters the exit routine, as shown in block 1603.

As was mentioned above in conjunction with the discussion of block 1516 of FIG. 15, the microprocessor 20 enters the transmit data routine when it finds STATE(I) of the channel (I-8) to equal any number from 2 through 9. Each of these values of STATE(I) is associated with the transmission by the interface unit 10 of a bit of the eight data bits that are transmitted by the interface unit 10 after a start bit and before two stop bits under the communication protocol of the channels 0–7.

Figure 17:
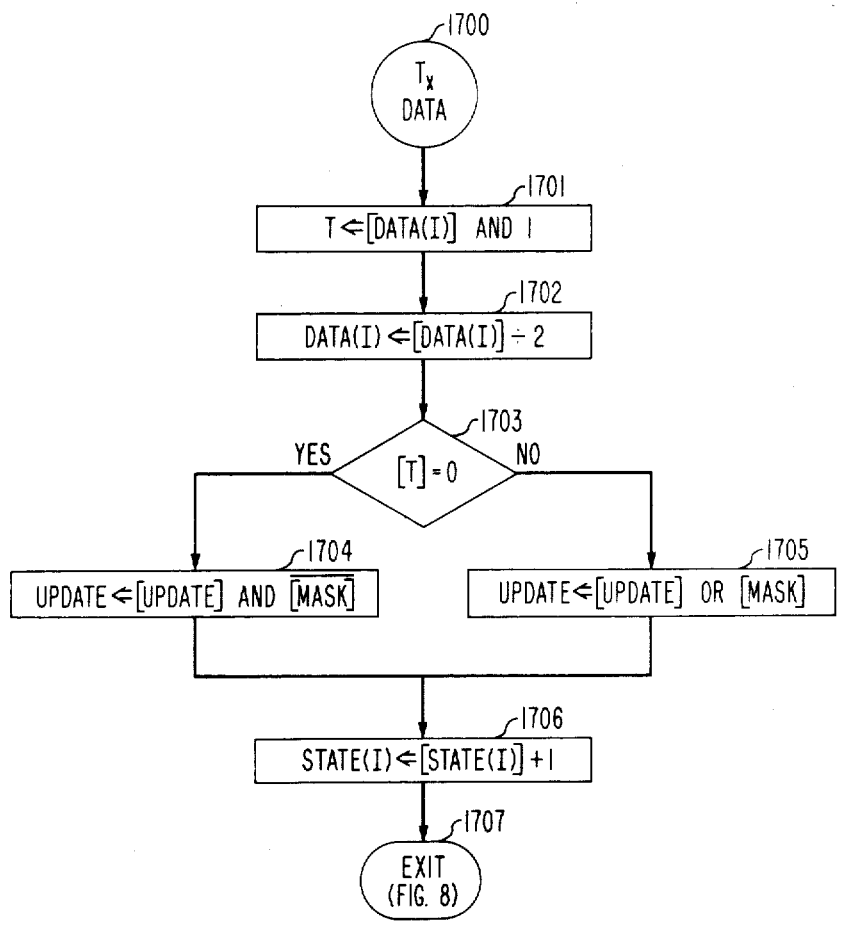

The transmit data routine is flowcharted in FIG. 17. It is entered when the microprocessor 20 encounters a transmit data condition, as shown in block 1700. As shown in block 1701, the microprocessor 20 picks off a data bit of the byte intended for the channel (I-8) by retrieving the data byte from DATA(I), performing an AND operation thereon with the number 1, and storing the result in T. The microprocessor 20 then shifts the remaining data bits in DATA(I) by one bit position to the right, by dividing DATA(I) by two, and stores the result in DATA(I), as shown in block 1702.

The processor 20 tests the value of the data bit contained in T, as shown in block 1703. If the bit in T has a value of zero, the microprocessor 20 retrieves the values of UPDATE and of MASK, performs an AND operation on the value of UPDATE and the inverse value of MASK, and stores the result in UPDATE, as shown in block 1704. This forces the bit of UPDATE associated with the channel (I-8) to zero, as was explained in conjunction with block 1601 of FIG. 16, to reflect the value of the data bit contained in T.

If the data bit contained in T has a nonzero value, the microprocessor 20 retrieves the values of UPDATE and of MASK, performs an OR operation thereon, and stores the result in UPDATE, as shown in block 1705. The effect of this operation is to force the bit of UPDATE associated with the channel (I-8) to one, to reflect the value of the data bit contained in T.

From either the block 1704 or the block 1705 the microprocessor 20 proceeds to block 1706, where it marks the transmission of a data bit to the channel (I-8) by incrementing STATE(I) by one. The microprocessor 20 then leaves the transmit data routine of FIG. 17 and proceeds to the exit routine, as shown by block 1707.

As was mentioned above in conjunction with the discussion of block 1516 of FIG. 15, the microprocessor 20 enters the transmit stop routine when it finds STATE(I) of the channel (I-8) to be greater than 9, that is, when eight data bits have been transmitted across the channel (I-8). Each of these values of STATE(I) is associated with transmission by the interface unit 10 of one of the two stop bits signaling the end of transmission.

Figure 18:
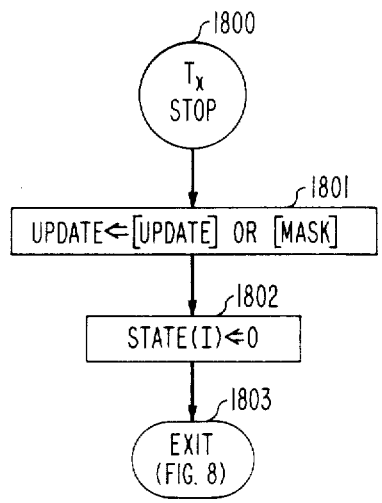

The transmit stop routine is flowcharted in FIG. 18. It is entered when the microprocessor 20 encounters a transmit stop condition, as shown in block 1800. As shown in block 1801, the microprocessor 20 retrieves the values of UPDATE and of MASK, performs an OR operation thereon, and stores the result in UPDATE. As MASK has zeros at all bit positions but the one associated with the channel (I-8) being serviced, the result of the operation is to force the bit in UPDATE associated with the channel (I-8) to one to indicate a stop bit.

The microprocessor 20 then resets STATE(I) to zero, to indicate that the channel (I-8) is idle, as shown in block 1802. The microprocessor 20 then leaves the stop routine of FIG. 18 and proceeds to the exit routine, as shown in block 1803.

The second stop bit is transmitted by the interface unit 10 across the channel (I-8) during the next transmit cycle when the channel (I-8) is again serviced, by virtue of the fact that the microprocessor finds STATE(I) to equal 0 in the block 1501 of FIG. 15 and hence proceeds through the transmit routine to block 1511 without changing the value of the bit of UPDATE that is associated with the channel (I-8).

Returning now to FIG. 7, the microprocessor 20 enters the transmit routine at the block 705 eight times in succession but during one bit interval, at every pass performing the transmit functions for one channel 0-7 and therefore servicing all channels 0-7 in succession during a single bit interval. Because the channels 0-7 and terminals 9 do not "recognize" a time period shorter than a bit interval, from their viewpoint they are being serviced by the interface unit 10 simultaneously, with respect to both transmit and receive functions.

Of course, various changes and modifications to the illustrative embodiment described above will be apparent to those skilled in the art. For example, only those portions of the interface unit 10 which are involved in interfacing transmissions from the CPU 13 to the terminals 9 may be utilized, for example with output peripherals such as certain display units or printers which return no data to the CPU 13, and the other portions 56 of the interface unit 10 may be eliminated. Conversely, only those portions of the interface unit which are involved in interfacing transmissions from the terminals 9 to the CPU 13 may be utilized, for example with input peripherals such as certain keyboards or optical scanning units which receive no data from the CPU 13, and the other portions 55 of the interface unit 10 may be eliminated. Or the channels 0-7 need not be bit serial channels; they may be bit parallel channels, but narrower than the CPU bus 11. Such changes and modifications can be made without departing from the spirit and the scope of the invention and without diminishing its attendant advantages. It is therefore intended that such and other changes and modifications be covered by the following claims.

What is claimed is:

1. A method of interfacing a plurality of narrow-word communication channels to a wide-word communication channel wherein each narrow word appearing on a narrow-word communication channel has a predetermined interval of duration including a plurality of time slots, the method comprising the steps of:
sampling each narrow-word communication channel a plurality of times during each interval to obtain a plurality of samples of each narrow word appearing on each narrow-word communication channel;
storing the samples for processing;
during each one of a plurality of time slots of each interval, processing stored samples of a different one narrow-word communication channel selectively to identify among the processed samples of each narrow-word communication channel a particular sample of a narrow word appearing on that narrow word communication channel;
during a plurality of intervals, storing for each narrow-word communication channel particular samples of a plurality of narrow words appearing on that narrow-word communication channel to assemble from the particular samples a wide word associated with that narrow-word communication channel; and
supplying each assembled wide word to the wide-word communication channel.

2. The method of claim 1 wherein
the step of sampling comprises the step of
sampling each narrow-word communication channel during each time slot of each interval.

3. The method of claim 1 wherein the step of processing comprises the steps of:
during a single time slot of each interval, processing the stored samples of one narrow-word communication channel selectively to identify among the processed samples a particular sample of a narrow word appearing on the one narrow-word communication channel; and
during each interval, repeating the preceding processing step for each narrow-word communication channel.

4. The method of claim 1 further comprising the steps of:
receiving from the wide-word communication channel wide words each associated with a narrow-word communication channel and comprising a plurality of narrow words;
storing the received wide words;

during each one of a plurality of time slots of each interval, selectively picking off a narrow word from a different stored wide word associated with a different one narrow-word communication channel for transmission on the associated narrow-word communication channel; and for an interval, transmitting each picked off narrow word on the word's associated narrow-word communication channel.

5. The method of claim 4 wherein the step of picking off comprises the steps of:

during a single time slot of each one of a plurality of intervals, selectively picking off a narrow word from a stored wide word associated with one narrow-word communication channel; and during each interval, repeating the preceding picking off step for each narrow-word communication channel.

6. The method of claim 4 wherein the step of repeating the preceding picking off step is preceded by the step of:

commencing to transmit a picked off narrow word on the word's associated narrow-word communication channel; and wherein the step of repeating the preceding picking off step comprises the step of:

repeating the preceding commencing to transmit step for each narrow-word communication channel during a different time slot and during each interval.

7. The method of claim 1 wherein each narrow-word communication channel is a bit-serial channel; wherein each wide-word communication channel is a bit parallel channel; wherein a narrow word is a bit; and wherein a wide word is a byte.

8. A method of interfacing a plurality of bit-serial communication channels to a bit-parallel communication channel wherein each bit appearing on a serial channel has a predetermined interval of duration including a plurality of time slots, the method comprising the steps of:

during each time slot of each interval, sampling each serial channel to obtain a sample of each bit appearing on each serial channel during each time slot;

storing for processing the samples obtained during each time slot;

during a single time slot of each interval, processing the stored samples of one serial channel selectively to identify among the processed samples a sample of a center of a bit appearing on the one serial channel;

repeating the preceding processing step during each interval for each serial channel;

during a plurality of intervals, storing for each serial channel a plurality of bit center samples each of a different bit appearing on that serial channel to assemble from the bit center samples of that serial channel a byte associated with that serial channel; and supplying each assembled byte to the bit-parallel channel.

9. The method of claim 8 wherein the step of sampling comprises the step of:

during each time slot of each interval, simultaneously sampling all serial channels.

10. The method of claim 8 wherein the step of processing comprises the step of:

during a single time slot of each one of a plurality of intervals, selecting from among the stored samples of one serial channel a sample taken during a determined one of the time slots of the interval.

11. The method of claim 10 wherein the step of selecting comprises the step of:

during a single time slot of at least one of a plurality of intervals, performing a binary search of the stored samples of one serial channel selectively to determine the time slot of an interval during which time slot the sample of the center of a bit was taken.

12. The method of claim 8 further comprising the steps of:

receiving from the bit-parallel channel bytes each associated with a bit-serial channel and comprising a plurality of bits;

storing the received bytes;

during a single time slot of each one of a plurality of intervals, selectively picking off a bit from a stored byte associated with one serial channel for transmission on the associated serial channel;

repeating the preceding picking off step during each interval for each serial channel; and for an interval, transmitting each picked off bit on the bit's associated serial channel.

13. The method of claim 12 wherein the step of repeating the preceding picking off step is preceded by the step of:

commencing to transmit a picked off bit on the bit's associated serial channel; and wherein the step of repeating the preceding picking off step comprises the step of:

repeating the preceding commencing to transmit step for each serial channel during a different time slot and during each interval.

14. A method of interfacing a plurality of bit-serial communication channels to a bit-parallel communication channel wherein each bit appearing on a serial channel has a predetermined interval of duration including a plurality of time slots, the method comprising the steps of:

simultaneously sampling all serial channels to obtain a sample of each bit appearing on each serial channel;

storing the obtained samples for processing;

processing stored samples of one serial channel selectively to identify among the stored samples a sample of a center of a bit appearing on the one serial channel;

storing any identified bit center sample to assemble a byte from a plurality of identified bit center samples each of a different bit appearing on the one serial channel;

performing the preceding steps during a single time slot;

repeating the immediately preceding step for each serial channel during a different time slot of one interval;

repeating the immediately preceding step during each interval; and supplying each assembled byte to the bit-parallel channel.

15. The method of claim 14 further comprising the steps of:

receiving from the bit-parallel channel bytes each associated with a bit-serial channel and comprising a plurality of bits;

storing the received bytes;

transmitting bits on all serial channels simultaneously, a bit on each serial channel;

selectively picking off a bit from a stored byte associated with one serial channel;

updating the bit being transmitted on the one serial channel to the picked off bit;

performing the immediately preceding three steps during a single time slot;

repeating the immediately preceding step for each serial channel during a different time slot of one interval; and repeating the immediately preceding step during each interval.

16. A method of interfacing a plurality of bit-serial communication channels to a bit-parallel communication channel wherein each bit appearing on a serial channel has a predetermined interval of duration including a plurality of time slots, the method comprising the steps of:

receiving from the bit-parallel channel bytes each associated with a bit-serial channel and comprising a plurality of bits;

storing the received bytes;

transmitting bits on all serial channels simultaneously, a bit on each serial channel;

simultaneously sampling all serial channels to obtain a sample of each bit appearing on each serial channel;

storing the obtained samples for processing;

performing the immediately preceding three steps during each time slot of each interval;

processing stored samples of one serial channel selectively to identify among the stored samples a sample of a center of a bit appearing on the one serial channel;

storing any identified bit center sample to assemble a byte from a plurality of identified bit center samples each of a different bit appearing on the one serial channel;

performing the immediately preceding three steps for each serial channel during a different one time slot of each interval;

supplying each assembled byte to the bit-parallel channel;

selectively picking off a bit from a stored byte associated with one serial channel;

updating the bit being transmitted on the one serial channel to the picked off bit; and performing the immediately preceding two steps for each serial channel during a different one time slot of each interval.

17. The method of claim 16 wherein the time slots of each interval during which the steps of processing and bit center sample storing are performed are different from the time slots of each interval during which the steps of picking off and updating are performed.

18. An apparatus for interfacing a plurality of narrow-word communication channels to a wide-word communication channel wherein each narrow word appearing on a narrow-word communication channel has a predetermined interval of duration including a plurality of time slots, the apparatus comprising:

means for sampling each narrow-word communication channel a plurality of times during each interval to obtain a plurality of samples of each narrow word appearing on each narrow-word communication channel;

first storage means cooperative with the sampling means for storing the samples for processing;

means cooperative with the first storage means for processing stored samples of a different one narrow-word communication channel during each one of a plurality of time slots of each interval, selectively to identify among the processed samples of each narrow-word communication channel a particular sample of a narrow word appearing on that narrow word communication channel;

second storage means cooperative with the processing means for storing for each narrow-word communication channel over a plurality of intervals particular samples of a plurality of narrow words appearing on that narrow-word communication channel to assemble from the particular samples a wide word associated with that narrow-word communication channel; and means cooperative with the second storage means for supplying each assembled wide word to the wide-word communication channel.

19. The apparatus of claim 18 wherein
the sampling means comprise
means for sampling each narrow-word communication channel during each time slot of each interval.

20. The apparatus of claim 18 wherein the processing means comprises:

means for processing the stored samples of one narrow-word communication channel during a single time slot of each interval, selectively to identify among the processed samples a particular sample of a narrow word appearing on the one narrow-word communication channel;

means for causing the processing means to process stored samples of each narrow-word communication channel during each interval.

21. The apparatus of claim 18 further comprising:

means for receiving from the wide-word communication channel wide words each associated with a narrow-word communication channel and comprising a plurality of narrow words;

third storage means cooperative with the receiving means for storing the received wide words;

means cooperative with the third storage means for selectively picking off during each one of a plurality of time slots of each interval a narrow word from a different stored wide word associated with a different one narrow-word communication channel for transmission on the associated narrow-word communication channel; and means cooperative with the picking off means for transmitting each picked off narrow word on the word's associated narrow-word communication channel for an interval.

22. The apparatus of claim 21 wherein the picking off means comprise:

means for selectively picking off a narrow word from a stored wide word associated with one narrow-word communication channel during a single time slot of each of a plurality of intervals; and means for causing the picking off means to selectively pick off narrow words a different one for transmission on each narrow-word communication channel during each interval.

23. The apparatus of claim 21 wherein the transmitting means comprise
means cooperative with the picking off means for commencing to transmit each picked off narrow word on the word's associated narrow-word communication channel during a different time slot.

24. The apparatus of claim 18 wherein
each narrow-word communication channel is a bit-serial channel; wherein
each wide-word communication channel is a bit parallel channel; wherein
a narrow word is a bit; and wherein
a wide word is a byte.

25. An apparatus for interfacing a plurality of bit-serial communication channels to a bit-parallel communication channel wherein each bit appearing on a serial channel has a predetermined interval of duration including a plurality of time slots, the apparatus comprising:
means for sampling each serial channel in each time slot of each interval to obtain a sample of each bit appearing on each serial channel during each time slot;
first storage means cooperative with the sampling means for storing for processing the samples obtained during each time slot;
means cooperative with the first storage means for processing the stored samples of one serial channel during a single time slot of each interval, selectively to identify among the processed samples a sample of a center of a bit appearing on the one serial channel;
means for causing the processing means to process stored samples of each serial channel during each interval;
second storage means cooperative with the processing means for storing for each serial channel over a plurality of intervals a plurality of bit center samples each of a different bit appearing on that serial channel to assemble from the bit center samples of that serial channel a byte associated with that serial channel; and
means cooperative with the second storage means for supplying each assembled byte to the bit-parallel channel.

26. The apparatus of claim 25 wherein the sampling means comprise:
means for simultaneously sampling all serial channels during each time slot of each interval.

27. The apparatus of claim 25 wherein the processing means comprise:
means for selecting, during a single time slot of each one of a plurality of intervals, from among the stored samples of one serial channel a sample taken during a determined one of the time slots of the interval.

28. The apparatus of claim 27 wherein the selecting means comprise:
means for performing, during a single time slot of at least one of a plurality of intervals, a binary search of the stored samples of one serial channel selectively to determine the time slot of an interval during which time slot the sample of the center of a bit was taken.

29. The apparatus of claim 25 further comprising:
means for receiving from the bit-parallel channel bytes each associated with a bit-serial channel and comprising a plurality of bits;
third storage means cooperative with the receiving means for storing the received bytes;
means cooperative with the third storage means for selectively picking off, during a single time slot of each of a plurality of intervals, a bit from a stored byte associated with one serial channel for transmission on the associated serial channel;
means for causing the picking off means to selectively pick off bits a different one for transmission on each serial channel during each interval; and
means cooperative with the picking off means for transmitting each picked off bit on the bit's associated serial channel for an interval.

30. The apparatus of claim 29 wherein
the transmitting means comprise means cooperative with the picking off means for commencing to transmit each picked off bit on the bit's associated serial channel during a different time slot.

31. An apparatus for interfacing a plurality of bit-serial communication channels to a bit-parallel communication channel wherein each bit appearing on a serial channel has a predetermined interval of duration including a plurality of time slots, the apparatus comprising:
means for simultaneously sampling all serial channels during each time slot of each interval to obtain a sample of each bit appearing on each serial channel;
first storage means cooperative with the sampling means for storing the obtained samples for processing;
means cooperative with the first storage means for processing stored samples of one serial channel selectively to identify among the stored samples a sample of a center of a bit appearing on the one serial channel;
second storage means cooperative with the processing means for storing each identified bit center sample to assemble bytes therefrom, each byte assembled from a plurality of identified bit center samples each of a different bit appearing on one serial channel;
means for causing the processing means to perform its function for each serial channel during a different time slot of an interval during each interval;
means cooperative with the second storage means for supplying each assembled byte to the bit-parallel channel.

32. The apparatus of claim 31 further comprising the steps of:
means for receiving from the bit-parallel channel bytes each associated with a bit-serial channel and comprising a plurality of bits;
third storage means cooperative with the receiving means for storing the received bytes;
means for transmitting bits on all serial channels simultaneously, a bit on each serial channel;
means cooperative with the third storage means for selectively picking off a bit from a stored byte associated with one serial channel;
means cooperative with the picking off means and with the transmitting means for updating a bit being transmitted on the one serial channel to the picked off bit; and
means for causing the picking off means and the updating means to perform their functions for each serial channel during a different time slot of an interval during each interval.

33. The apparatus of claim 32 wherein the time slots of each interval during which the means for processing operate are different from the time slots of each interval during which the means for picking off and updating operate.

* * * * *